United States Patent [19]

Yokoyama et al.

[11] Patent Number: 5,436,876
[45] Date of Patent: Jul. 25, 1995

[54] OPTICAL HEAD AND OPTICAL MEMORY DEVICE

[75] Inventors: Osamu Yokoyama; Masatoshi Yonekubo; Hideaki Iwano; Hidefumi Sakata; Takashi Takeda; Tetsuya Seki; Shigeru Kogure, all of Suwa, Japan

[73] Assignee: Seiki Epson Corporation, Tokyo, Japan

[21] Appl. No.: 162,902

[22] Filed: Dec. 8, 1993

Related U.S. Application Data

[63] Continuation of Ser. No. 732,025, Jul. 18, 1991, abandoned.

[30] Foreign Application Priority Data

| Jul. 18, 1990 | [JP] | Japan | 2-189684 |
| Oct. 22, 1990 | [JP] | Japan | 2-284051 |
| Feb. 13, 1991 | [JP] | Japan | 3-20046 |

[51] Int. Cl.$^6$ ............................................ G11B 7/00
[52] U.S. Cl. ..................... 369/44.12; 369/44.23; 369/44.41; 369/112; 369/109; 250/201.5
[58] Field of Search ............ 369/109, 110, 111, 44.12, 369/44.23, 44.37, 44.24, 112, 122, 121, 44.41, 44.22; 385/7, 9, 10, 14; 250/201.5, 202

[56] References Cited

U.S. PATENT DOCUMENTS

| 4,065,786 | 12/1977 | Stewart | 369/44.41 |
| 4,410,969 | 10/1983 | Maeda | 369/44.41 |
| 4,425,636 | 1/1984 | Musha et al. | 369/44.41 X |
| 4,467,462 | 8/1984 | Shibata | 369/44.41 X |
| 4,929,823 | 5/1990 | Kato et al. | 369/44.23 |
| 4,945,529 | 7/1990 | Ono et al. | 369/109 |
| 4,983,017 | 1/1991 | Tsuji et al. | 369/109 |
| 5,049,732 | 9/1991 | Nagahama et al. | 369/44.37 |
| 5,065,380 | 11/1991 | Yokota | 369/109 |
| 5,111,449 | 5/1992 | Kuzata et al. | 369/44.37 |
| 5,113,386 | 5/1992 | Whitehead et al. | 369/44.23 |
| 5,180,909 | 1/1993 | Ohyama et al. | 369/44.12 |

FOREIGN PATENT DOCUMENTS

| 0186044 | 7/1986 | European Pat. Off. |
| 0311340 | 4/1989 | European Pat. Off. |
| 0338840 | 10/1989 | European Pat. Off. |
| 0372629 | 6/1990 | European Pat. Off. |

OTHER PUBLICATIONS

Japanese Patent Abstract, vol. 10, No. 127, May 13, 1986, Appln. No. 59-106200.

*Primary Examiner*—Georgia Y. Epps
*Assistant Examiner*—Nabil Hindi
*Attorney, Agent, or Firm*—Sughrue, Mion, Zinn, Macpeak & Seas

[57] ABSTRACT

A small and inexpensive optical head for detecting a recorded signal, a focusing error signal and a tracking error signal, and an optical memory device utilizing the optical head. A diffraction device (103) is provided having two chirped grating regions (103A, 103B) for dividing a light beam from an optical recording medium (105) and directing the divided beams toward four band-shaped photoelectric transducers (106) and an astigmatism generator formed by the diffraction device (103) and a positive lens (102). The four photoelectric transducers are positioned in a plane inclined with respect to the optical axis of zero-order diffraction light, and the longitudinal axes of each of the band-shaped photoelectric transducers are radially arranged relative to the optical axis.

7 Claims, 31 Drawing Sheets

OPTICAL HEAD AND OPTICAL MEMORY DEVICE

This is a Continuation of Application No. 07/732,025 filed Jul. 18, 1991 now abandoned.

BACKGROUND OF THE INVENTION

The present invention relates to an optical head and an optical memory device for recording and reproducing information utilizing a light beam.

FIG. 18 shows the structure of a magneto-optical recording and reproducing head as an example of an optical head of a conventional optical memory device.

As shown in the drawing, a light beam irradiated from a light source 1801 is passed through a lens 1802, beam splitters 1803 and 1804, and is condensed on a magneto-optical recording medium by an objective lens 1805 and reflected from a surface of the magneto-optical medium 1806 as a light beam including information. A part of the reflected light beam is divided by the beam splitter 1804 and directed to an optical system comprised of a lens 1807, a Wollaston prism 1808, and a photodiode 1809. Thereby, a magneto-optical reproducing signal is obtained.

The other part of the reflected light beam divided by the beam splitter 1803 is directed to an optical system comprised of a lens 1810, a beam splitter 1811, a knifeedge 1812, a photodiode 1813 to obtain therefrom a focusing error signal. The reflected light beam is divided by the beam splitter 1811 and radiated on a photodiode 1814 to thus obtain a tracking error signal.

However, a conventional optical head has many optical members constituting the overall optical system for detecting signals, which has a problem due to its large size and high cost.

Accordingly, an object of the present invention is to provide an optical head of small size and low production cost. Another object of the invention is to provide an optical memory device employing such an optical head.

SUMMARY OF THE INVENTION

To achieve the above objects, an optical head of the present invention is characterized by comprising diffraction means having two chirped grating regions for dividing a light beam from an optical recording medium and directing the divided light toward four photoelectric transducers, and astigmatism producing means including the diffraction means, a positive lens and four photoelectric band-shaped transducers, wherein the transducers are positioned in a plane which is inclined to an optical axis of zero-order diffracted light of the diffraction means and a longitudinal edge of each photoelectric transducer is radially arranged relative to the optical axis.

Further, an analyzer may be located in front of the four photoelectric transducers. The analyzer is divided into at least two pieces, with the transmitting axes of the divided pieces arranged perpendicular to each other.

The light detecting region of the four photoelectric transducers may be restricted by a light shielding mask. The four photoelectric transducers are preferably mounted on a substrate of the same package and arranged perpendicular or inclined relative to an optical axis of the zero-order diffracted light.

A first embodiment of an optical memory device of the present invention for accomplishing the above purpose is characterized by comprising an optical head comprising astigmatism generating means including diffraction means having two chirped grating regions for dividing light beams from an optical recording medium and directing the divided beam toward a positive lens and four band-shaped photoelectric transducers, wherein the four photoelectric transducers are positioned in a plane inclined relative to an optical axis of zero-order diffracted light from the diffraction means and a longitudinal axis of each the photoelectric transducer is radially arranged relative to said optical axis, focusing servo means for focusing in response to a difference signal between a sum of outputs from the photoelectric transducers for receiving positive first-order diffracted light from the first region and the second region and a sum of outputs from photoelectric transducers for receiving negative first-order diffracted light from the first region and the second region, and tracking servo means for tracking in response to a difference signal between a sum of the outputs from the photoelectric transducers for receiving positive first-order diffracted light and negative first-order diffracted light from the first region and a sum of the outputs from the photoelectric transducers for receiving positive first-order diffracted light and negative first-order diffracted light from the second region.

A second embodiment of an optical memory device of the present invention for accomplishing the above purpose is characterized by comprising an optical head comprising astigmatism generating means including diffraction means having two chirped grating regions for dividing light beams from an optical recording medium and directing the divided beams toward four photoelectric transducers and a positive lens and four band-shaped photoelectric transducers, wherein said four photoelectric transducers are positioned in a plane inclined relative to an optical axis of zero-order diffracted light of the diffraction means and a longitudinal axis of each photoelectric transducer is radially arranged to said optical axis, focusing servo means for focusing in response to a difference signal between a sum of outputs from the photoelectric transducers for receiving positive first-order diffracted light from the first region and the second region and a sum of outputs from photoelectric transducers for receiving negative first-order diffracted light from the first region and the second region, tracking servo means for tracking in response to a difference signal between a sum of the outputs from the photoelectric transducers for receiving positive first-order diffracted light and negative first-order diffracted light from the first region and a sum of the outputs from the photoelectric transducers for receiving positive first-order diffracted light and negative first-order diffracted light from the second region, magneto-optical signal reproducing means for obtaining a magneto-optical reproducing signal from a high frequency component of a difference signal between a sum of outputs from the first and the second photoelectric transducers and a sum of the outputs from the third and the fourth photoelectric transducers. In this case, analyzers are positioned in front of the photoelectric transducers. The transmitting axis of one analyzer positioned in front of the first and second photoelectric transducers of the four photoelectric transducers is angled 45° with respect to the polarizing direction of the light source and the transmitting axis of another analyzer positioned in front of the third and fourth photoelectric transducers is angled 90° with respect to the transmitting axis of the analyzer positioned in front of the first and second photoelectric transducers.

DESCRIPTION OF THE PREFERRED EMBODIMENTS (Embodiment 1)

FIGS. 1 through 7(a)-7(b) show a first embodiment according to the present invention of an optical head and an optical memory device employing the optical head.

Figure 1:
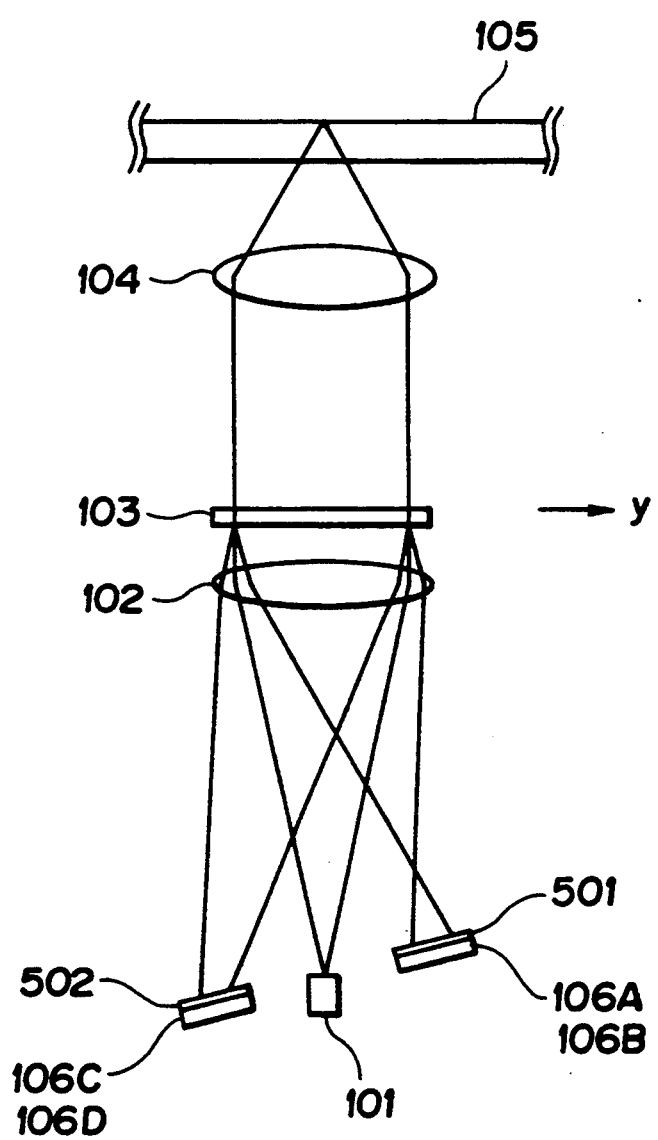
FIG. 1 is a cross-sectional view of an optical head of a first embodiment of the present invention.

FIG. 1 shows a cross-sectional view of the optical head of the first embodiment. Reference numerals 101, 102, 103, 104 and 105 indicate a semiconductor laser forming a light source, a positive lens, a diffraction device, an objective lens and a magneto-optical medium as an optical recording medium, respectively. Reference numerals 106A, 106B, 106C and 106D indicate respective photoelectric transducers, and the symbol y indicates the track direction of the optical recording medium. A light beam radiated from the semiconductor laser 101 is formed into a parallel beam by the positive lens 102, and the resulting beam is passed through the diffraction device 103 and condensed by the objective lens 104, whereby a light spot is formed on the optical recording medium 105. The light beam reflected from the optical recording medium is returned to the diffraction device 103 again through the objective lens.

Figure 2:
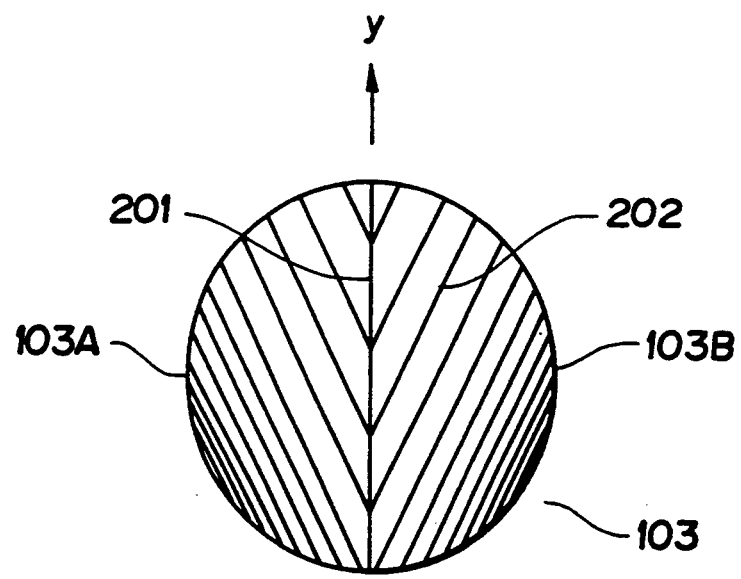
FIG. 2 shows a plane view of a diffraction device used in the optical head of the first embodiment of the present invention.

The diffraction device 103 is a phase diffraction grating and has a plane pattern as shown in FIG. 2. The diffraction device 103 is divided into two chirped grating regions by a boundary line 201. The boundary line 201 is parallel to the track (y direction) of the optical recording medium 105. The chirped grating regions 103A and 103B have a linear grating 202 for monotonically increasing and decreasing periods, respectively. The direction of the linear gratings 202 is angled with respect to the boundary line 201, and the two regions 103A and 103B are symmetric with each other.

Although the above symmetric pattern of the chirped gratings 103A and 103B along the boundary line 201 is preferred, various modified patterns are allowable if the patterns have the same effect.

Figure 19:
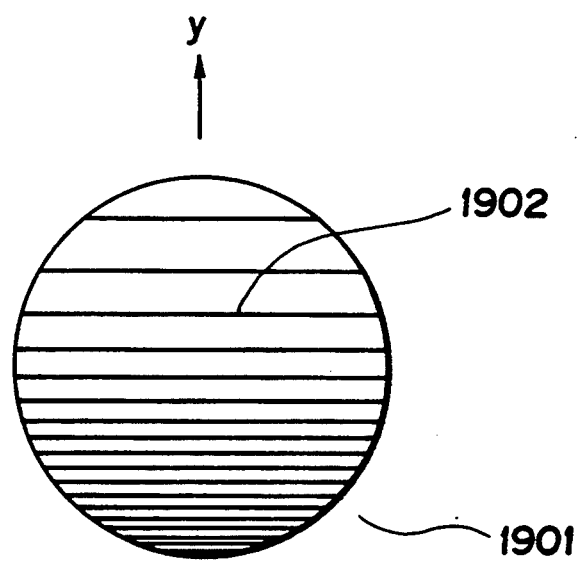
FIG. 19 is an explanatory diagram for a diffraction device having a grating pattern in which the period is changed along one direction.
Figure 20:
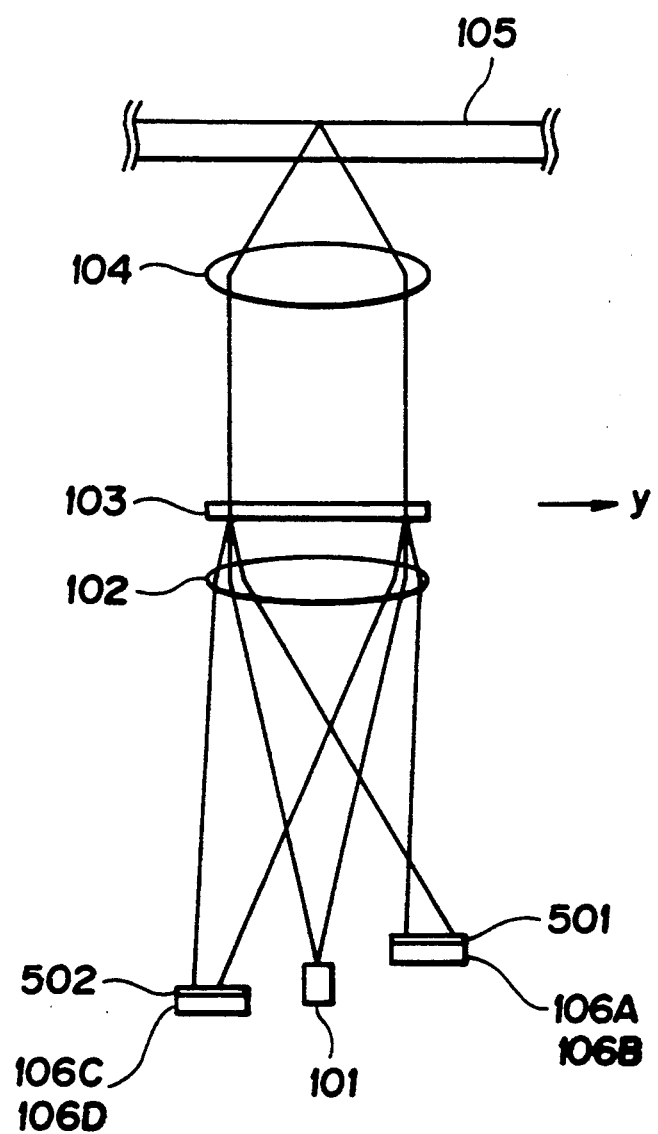
FIG. 20 is a cross-sectional view of the optical head of a sixth embodiment of the present invention.
Figure 21:
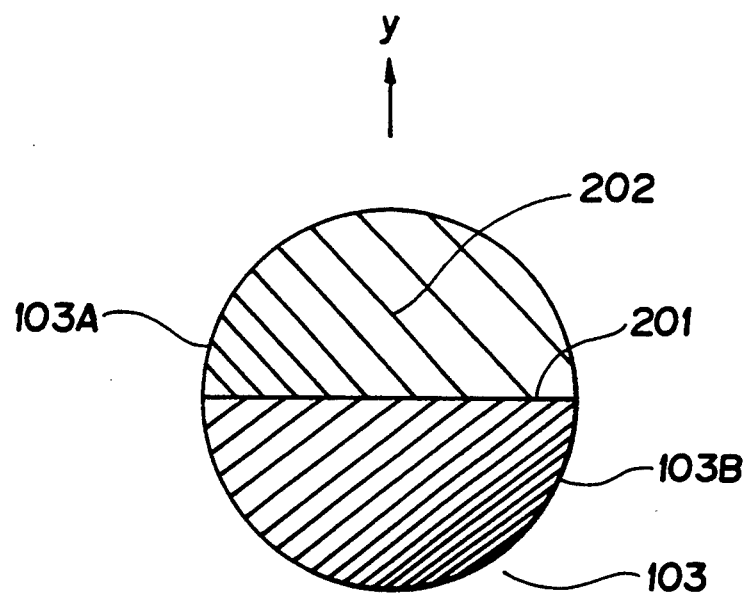
FIG. 21 is a plan view of the diffraction device of the optical head of the sixth embodiment of the present invention.
Figure 22:
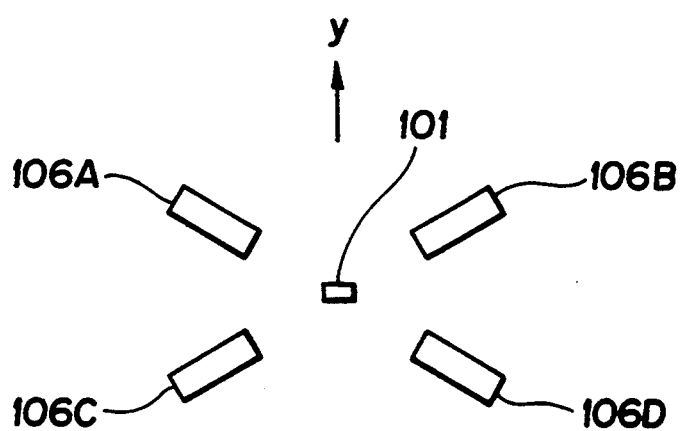
FIG. 22 shows an arrangement of photoelectric transducers and the semiconductor laser of the optical head of the sixth embodiment of the present invention.
Figure 23A:
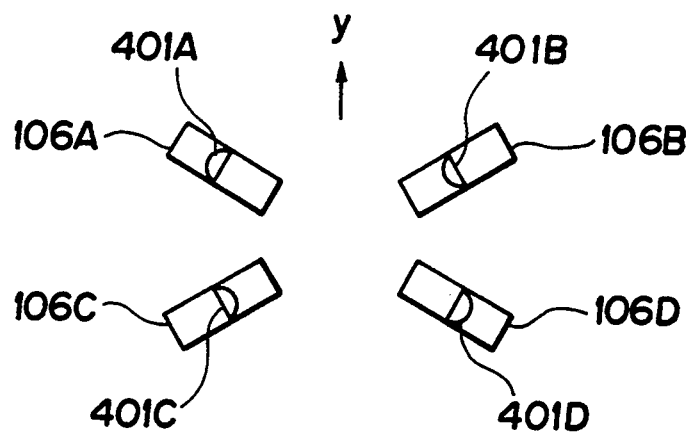
FIGS. 23(a)-23(c) are an explanatory diagram for the principle of detecting focusing in error signals of the optical head of the sixth embodiment of the present invention.
Figure 23B:
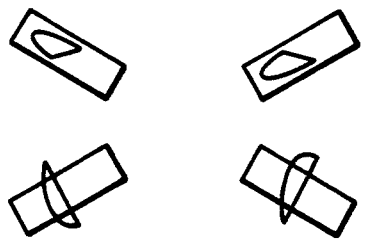
Figure 23C:
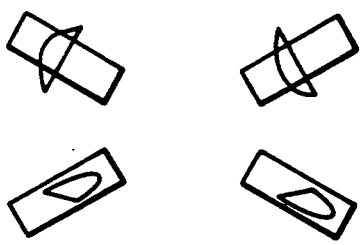
Figure 24:
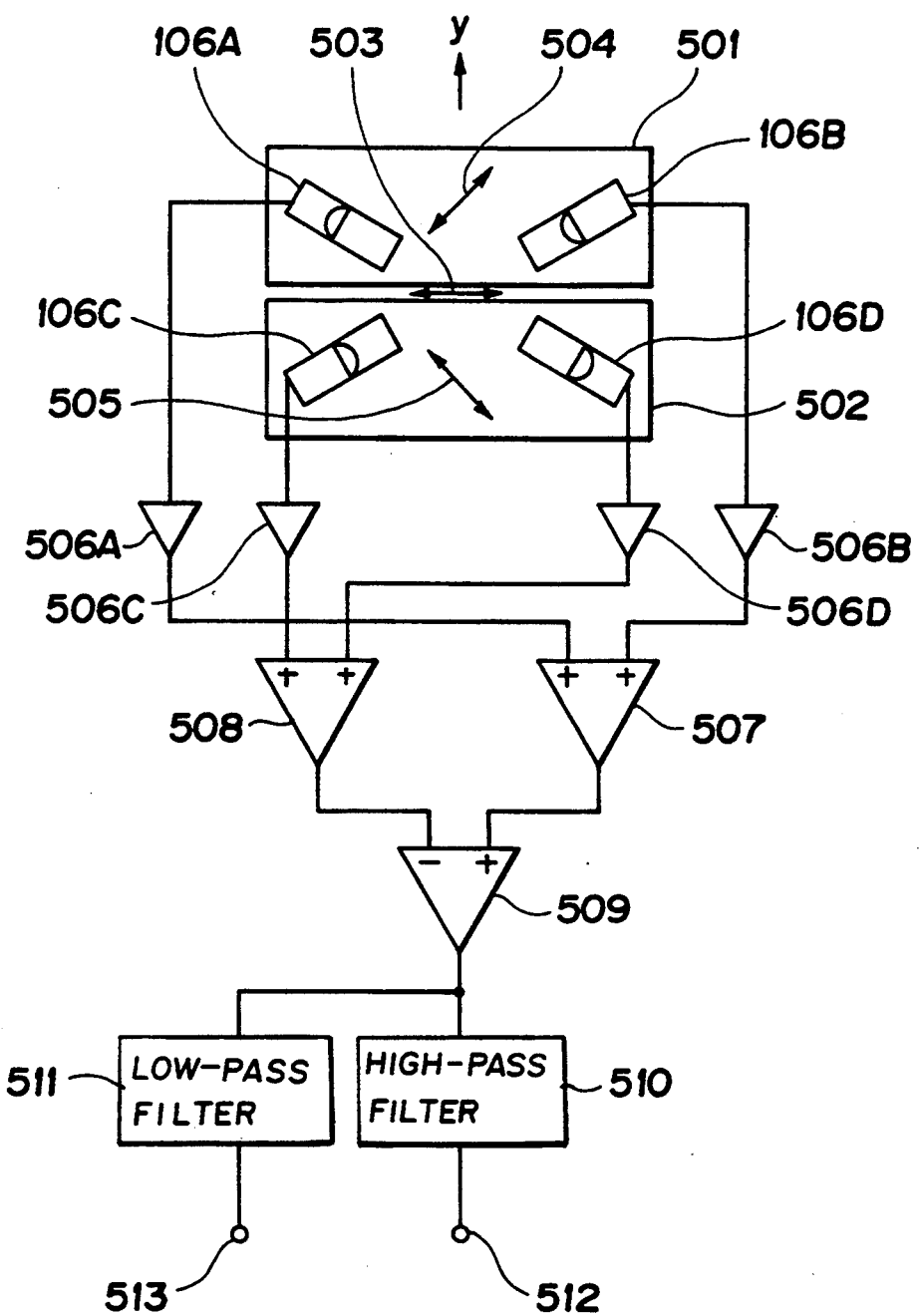
FIG. 24 shows a signal processing circuit for the magneto-optical reproducing signal and focusing error signal of the optical memory device of the sixth embodiment of the present invention.
Figure 25:
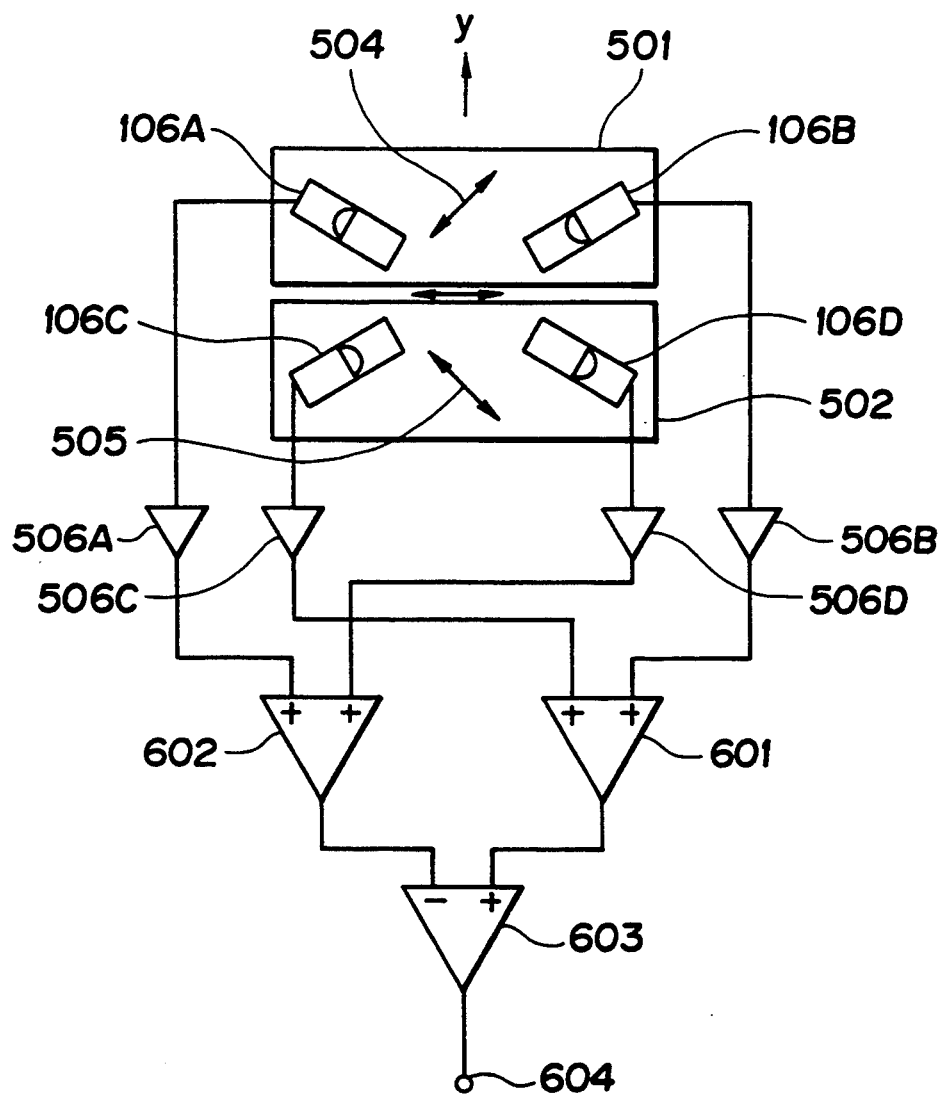
FIG. 25 shows a signal processing circuit for the tracking error signal of the optical memory device of the sixth embodiment of the present invention.

As shown in FIG. 19, the diffraction grating pattern of the chirped grating 103A is the same to the left half side of a diffraction device 1901 having a grating pattern 1902 changing in one direction and rotated clockwise by 10°. The pattern of another chirped grating region 103B is the same to the right half side of the diffraction device 1901 as shown in FIG. 19 rotated counterclockwise by 10°. By the diffraction grating 1901 as shown in FIG. 19, an irradiated parallel ray is converted to positive first-order diffracted light for condensing the light beam along a focal line or negative first-order diffracted light for diverging the light beam from a focal line. In the drawing, the degree of the inclined angle is exaggerated.

Each positive first-order diffracted light beam and each negative first-order diffracted light beam passes through two chirped grating regions 103A and 103B of the diffraction device 103, that is, four diffracted light beams are received by four respective photoelectric transducers 106A, 106B, 106C and 106D.

Figure 3:
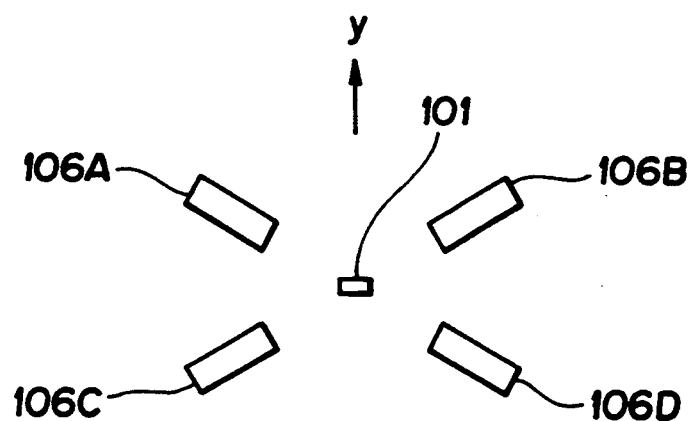
FIG. 3 shows the arrangement of a photoelectric transducer and a semiconductor laser used in the optical head of the first embodiment of the present invention.

The photoelectric transducers 106A, 106B, 106C and 106D are band-shaped and radially arranged relative to the semiconductor laser 101 (in a view from the side of the diffraction device 103 as shown in FIG. 3). That is, each longitudinal edge of the photoelectric transducers 106A, 106B, 106C and 106D is radially arranged with respect to the optical axis of the zero-order diffracted light of the diffraction device 103.

Further, the four photoelectric transducers 106A, 106B, 106C and 106D are positioned in one plane linearly inclined relative to the optical axis from the semiconductor laser 101 to the objective lens 104. In the diffraction beam, astigmatism is generated due to the combination of the chirped gratings 103A and 103B and the positive lens 102. Therefore, the photoelectric transducers 106A through 106D are arranged in a stepped condition along the optical axis so as to arrange each photoelectric transducers 106A through 106D within the circle of least confusion. In this embodiment, although the plane in which the photoelectric transducers 106A through 106D are arranged is linearly inclined with respect to the optical axis, the surface may be perpendicular to the optical axis if the elements are arranged in a stepped condition along the optical axis.

Figure 5:
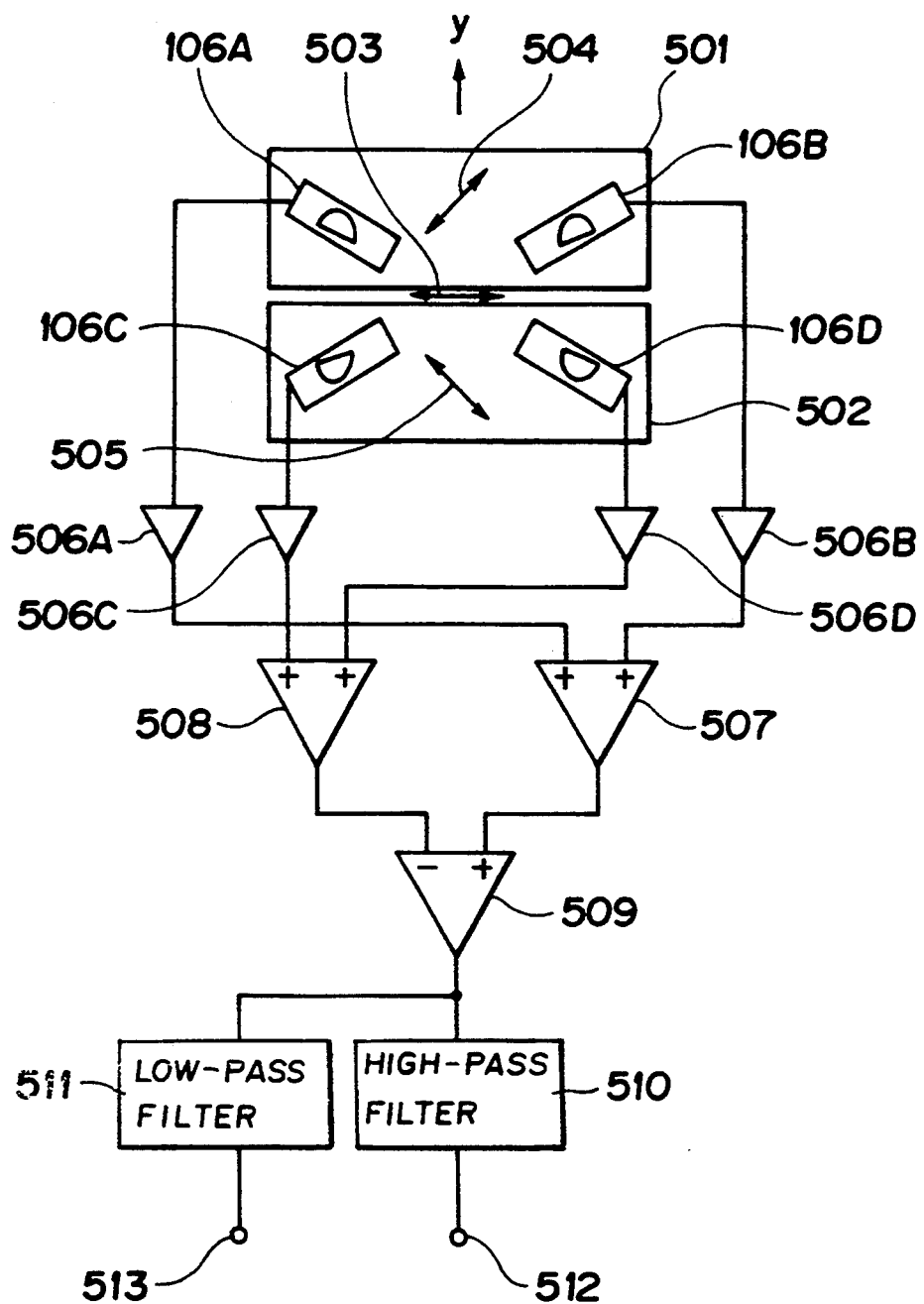
FIG. 5 shows a signal processing circuit for the magneto-optical reproducing signal and focusing error signal in an optical memory device of the first embodiment of the present invention.

As shown in FIG. 5, polarizing plates 501 and 502 are positioned in front of the photoelectric transducers 106A, 106B, 106C and 106D. The direction of the transmitting axis 504 of the polarizing plate 501 is angled 45° with respect to the polarizing direction 503 of the semiconductor laser beam and perpendicular to the direction of the transmitting axis 505 of the polarizing plate 502. In this embodiment, although the polarizing plate is used as a analyzer, other elements may be employed having the same analyzing performance.

Figure 7A:
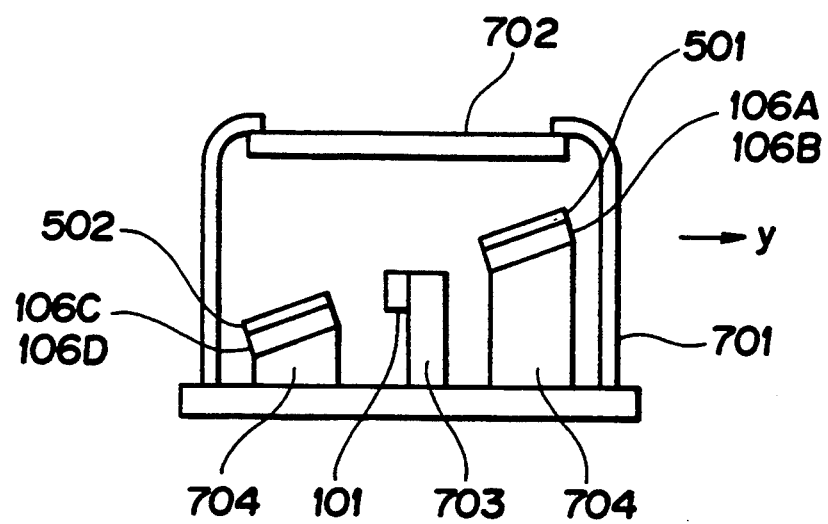
FIGS. 7(a)-7(b) show the structure of a package of the photoelectric transducers and the semiconductor laser of the optical head of the first embodiment of the present invention.
Figure 7B:
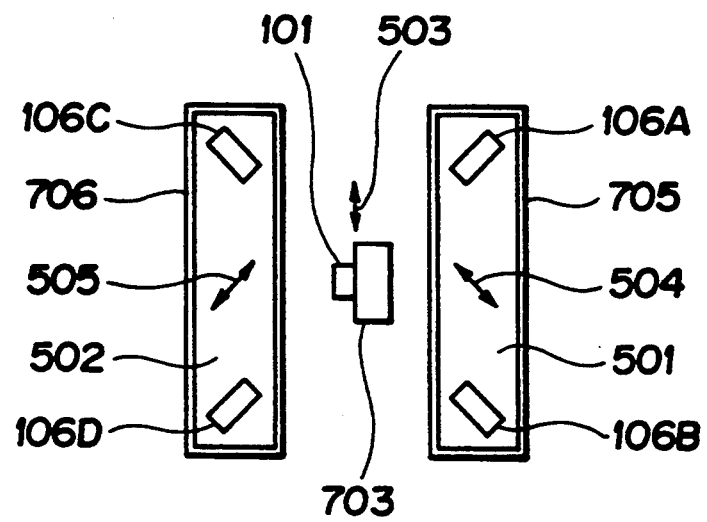

As shown in FIGS. 7(a) and 7(b), the semiconductor laser 101 and the photoelectric transducers 106A through 106D are arranged in a package 701 having a window 702. That is, as shown in FIGS. 7(a) and 7(b), the semiconductor laser 101 is attached to a heat sink 703, the photoelectric transducers 106A and 106B are formed on the common substrate 705, and the polarizing plate 501 is adhered on the transducers. On the other hand, the photoelectric transducers 106C and 106D are formed on the common substrate 706 and the polarizing plate 502 is adhered to the elements. Each substrate 705 and 706 is attached to the base mount 704, which has an inclined top surface. FIG. 7(a) shows a cross-sectional view and FIG. 7(b) shows a plan view in a view from the window 702.

Figure 4A:
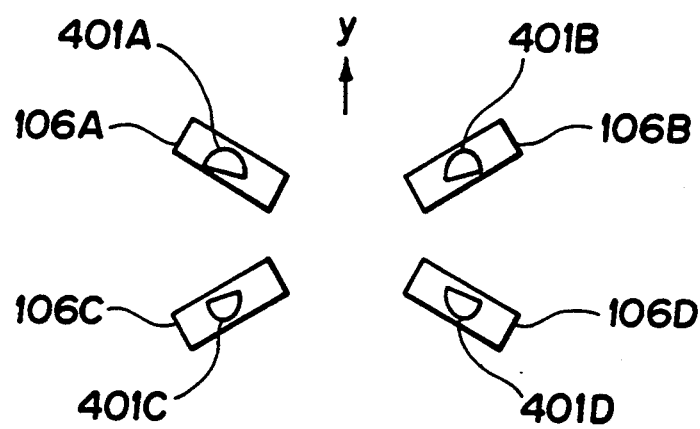
FIGS. 4(a)-4(c) are an explanatory diagram for the principle of detecting focusing error signals in the optical head of the present invention.

FIG. 4(a) shows each shape of the light spot on the photoelectric transducers 106A through 106D in the condition where the light is focused on the optical recording medium 105. These light spots 401A, 401B, 401C and 401D are located within the light-sensitive regions of each of the photoelectric transducers. The light spot 401A is positive first-order diffracted light of one chirped grating region 103B of the diffraction device 103, the light spot 401D is negative first-order diffracted light thereof, the light spot 401B is positive first-order diffracted light of another chirped grating region 103A of the diffraction device 103, and the light spot 401C is the negative first-order diffracted light thereof.

In the condition where the light spots 401A, 401B, 401C and 401D are positioned within the light-sensitive regions of the photoelectric transducers 106A through 106D, assuming the light intensities of the light-receiving regions are equal each other, the following equation is obtained:

$$(VA+VB)-(VC+VD)=0 \tag{1}$$

where VA, VB, VC and VD are the outputs from the respective photoelectric transducers 106A, 106B, 106C and 106D.

Figure 4B:
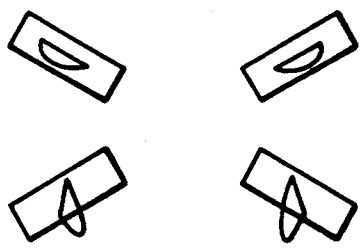

If the optical recording medium 105 is too far from the objective lens 104, as shown in FIG. 4(b), the light spots 401A and 401B are elongated in the longitudinal direction of the photoelectric transducers 106A and 106B, respectively, and the spots are positioned within the light-receiving regions of the respective photoelectric transducers 106A and 106B. On the other hand, the light spots 401C and 401D are elongated along the transverse direction of the photoelectric transducers 106C and 106D, and only a part of the spots is positioned within each light-receiving region of the photoelectric transducers 106C and 106D. Therefore, the following equation (2) is obtained:

$$(VA+VB)-(VC+VD)>0 \tag{2}$$

Figure 4C:
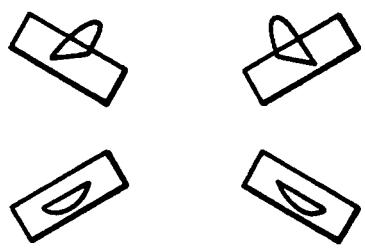

If the optical recording medium 105 is too near the objective lens 104, as shown in FIG. 4(c), the light spots 401C and 401D are elongated in the longitudinal direction of the photoelectric transducers 106C and 106D, respectively, and the spots are positioned within the light-receiving region of the photoelectric transducers 106C and 106D. On the other hand, the light spots 401A and 401B are elongated in the transverse direction of the photoelectric transducers 106A and 106B, and only a part of the spots are positioned within the light-receiving regions of the photoelectric transducers 106A and 106B. Therefore, the following equation (3) is obtained:

$$(VA+VB)-(VC+VD)<0 \tag{3}$$

Thus, a focusing error signal for indicating improper focusing can be obtained by comparing the sum of the outputs from the two photoelectric transducers 106A and 106B receiving the positive first-order diffracted light from the two chirped grating regions 103A and 103B and the sum of the outputs from the two photoelectric transducers 106C and 106D receiving the negative first-order diffracted light from the two chirped grating regions 103A and 103B.

Subsequently, a method for obtaining a tracking error signal will be explained.

If a light spot formed by the objective lens 104 is not positioned on a track on the optical recording medium 105, a difference of incident light intensity occurs between the chirped grating regions 103A and 103B since the direction (y-direction) of the track on the optical recording medium is parallel to the boundary line 201. Accordingly, a tracking error signal can be obtained for indicating when the light spot is not properly on the track by comparing with the sum of the outputs from the two photoelectric transducers 106B and 106C receiving the positive first-order and negative first-order diffracted light outputs from the one chirped grating region 103A and the sum of the outputs from the two photoelectric transducers 106A and 106D receiving the positive first-order and negative first-order diffracted light outputs from the other chirped grating region 103B. That is, if the result of calculating the following equation (4) is zero, tracking is correct. If the result is plus or minus, tracking is not correct.

$$(VB+VC)-(VA+VD) \qquad (4)$$

On the other hand, there are two methods available for reproducing information from the optical recording medium. According to one method, if the optical recording medium is of the phase-change type and the information is reproduced by changing the intensity of the reflected light from the medium, the total sum of the outputs from the four photoelectric transducers is calculated. On the other hand, according to the second method, if the optical recording medium is a type of magneto-optical recording medium, the information is reproduced by the following method.

As shown in FIG. 5, the direction of the transmitting axis 504 of the polarizing plate 501 positioned in front of the photoelectric transducers 106A and 106B acting as an analyzer is angled 45° with respect to the polarizing direction 503 of the semiconductor laser 101 acting as the light source. On the other hand, the direction of the transmitting axis 505 of the polarizing plate 502 positioned in front of the photoelectric transducers 106C and 106D is perpendicular to the transmitting axis 504 of the polarizing plate 501. Accordingly, the amount of rotation of the polarizing direction at the optical recording medium 105 can be detected and the information can be reproduced by calculating the difference signal, as indicated by the equation (5), by subtracting the sum of the outputs from the photoelectric transducers 106C and 106D from the sum of the outputs from the photoelectric transducers 106A and 106B.

$$(VA+VB)-(VC+VD) \qquad (5)$$

Although the above equation is the same as the equation for obtaining the focusing error signal, the frequency spectra are different from each other. The focusing error signal can be obtained from a low frequency component of the above calculated output, and the information signal can be obtained from the high frequency component thereof.

The focusing servo means for obtaining the focusing error signal and magneto-optical reproducing signal and the magneto-optical signal reproducing means are implemented as a signal processing circuit, as shown in FIG. 5. That is, the output from the four photoelectric transducers 106A, 106B, 106C and 106D is a current-/voltage converted by low-noise wideband preamplifiers 506A, 506B, 506C and 506D, respectively. The signals from the photoelectric transducers 106A and 106B are added in an adder 507, and the signals from the photoelectric transducers 106C and 106D are added in an adder 508. The outputs from the two adders 507 and 508 are input to a subtractor 509 and the difference signal is output. A magneto-optical signal 512 is obtained by taking a high frequency component of the difference signal by a high-pass filter 510, and a focusing error signal 513 is obtained by taking a low-frequency component of the difference signal by a low-pass filter 511.

Figure 6:
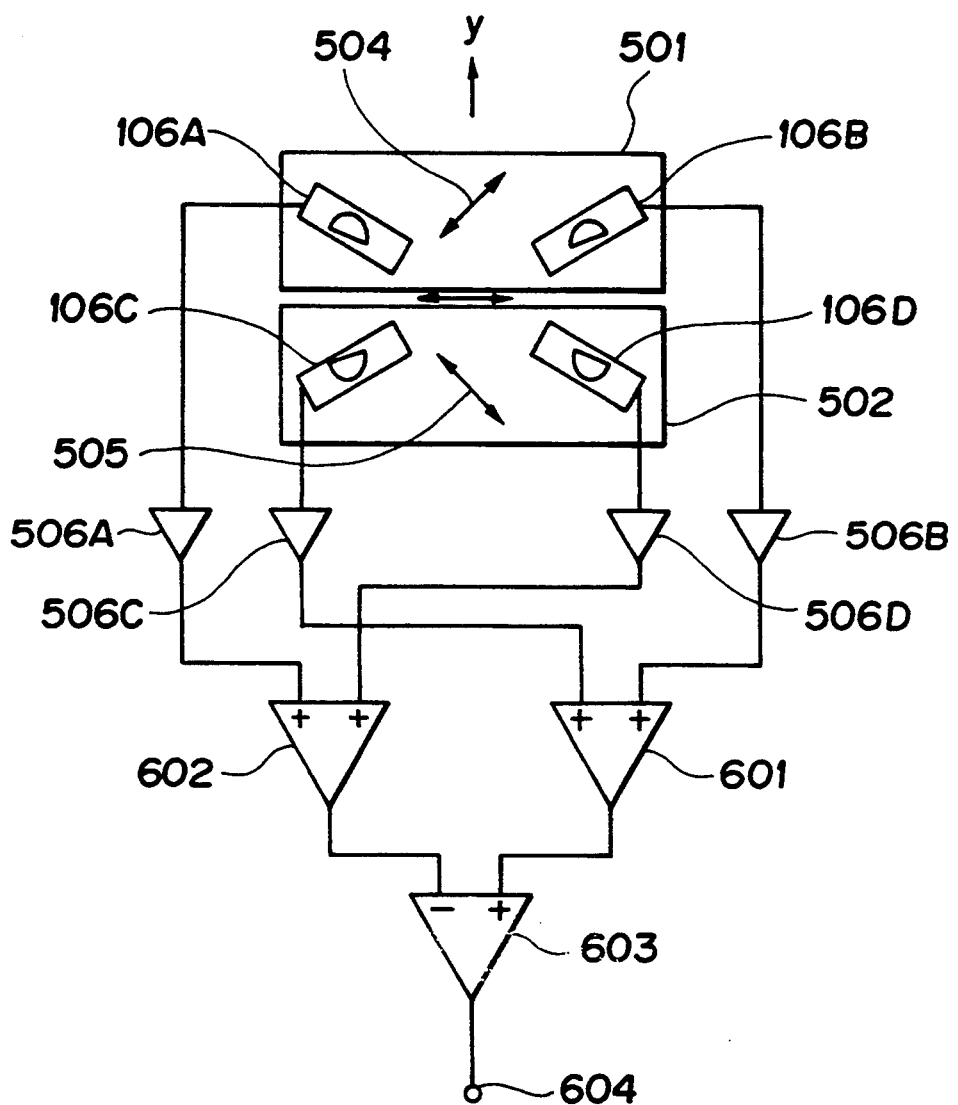
FIG. 6 shows a signal processing circuit for the tracking error signal in the optical memory device of the first embodiment of the present invention.

On the other hand, a tracking servo means for obtaining tracking error signal is implemented as a signal processing circuit, as shown in FIG. 6. That is, the outputs from the four photoelectric transducers 106A, 106B, 106C and 106D are a current/voltage converted by low-noise wideband preamplifiers 506A, 506B, 506C and 506D, respectively. The outputs from the photoelectric transducers 106B and 106C are added in an adder 601, and the outputs from the photoelectric transducers 106A and 106D are added in an adder 602. The outputs from the two adders 601, 602 are input to a subtractor 603, and the tracking error signal 604 is output as the difference signal.

Focusing and tracking are adjusted by driving an objective lens actuator in response to the focusing error signal 513 and the tracking error signal 604 obtained by the above method.

In this embodiment, although the direction of the transmitting axis 504 of the polarizing plate 501 in front of the photoelectric transducers 106A and 106B is common and the direction of the transmitting axis 505 of the polarizing plate 502 in front of the photoelectric transducers 106C and 106D is common, various modifications are possible. For example, it is possible to obtain a magneto-optical reproduced signal from the difference signal by subtracting the sum of the signals from the photoelectric transducers 106B and 106D from the sum of the signals from the photoelectric transducers 106A and 106C (or its high frequency component) by making the directions of the transmitting axis of the polarizing plate in front of the photoelectric transducers 106A and 106C common and making the direction 505 of the transmitting axis of the polarizing plates in front of the photoelectric transducers 106B and 106D common.

Figure 8:
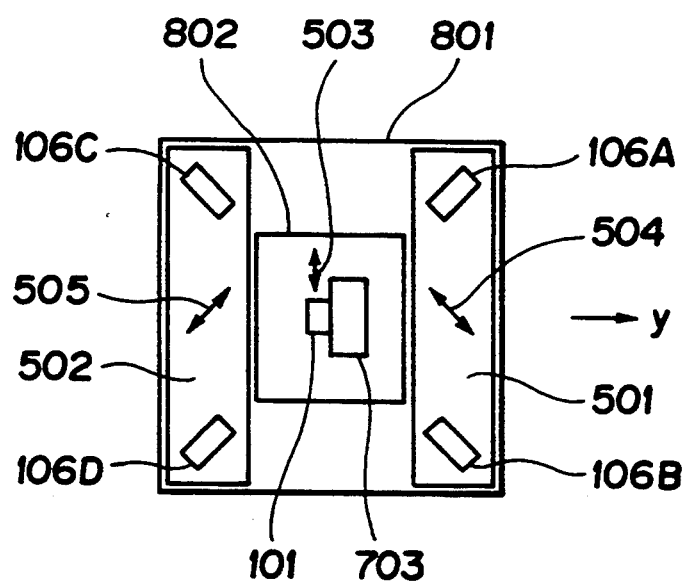
FIG. 8 shows an alternative structure of the photoelectric transducers of the optical head of the present invention.

An alternative structure of the photoelectric transducer is shown in FIG. 8. As shown in the drawing, the four photoelectric transducers 106A, 106B, 106C and 106D are formed on a common substrate 801. A polarizing plate 501 is attached to the photoelectric transducers 106A and 106B, and a polarizing plate 502 is attached to the photoelectric transducers 106C and 106D. An opening 802 is formed at a center portion of the substrate 801 by etching the substrate so as to provide a semiconductor laser 101 at the opening.

Figure 9A:
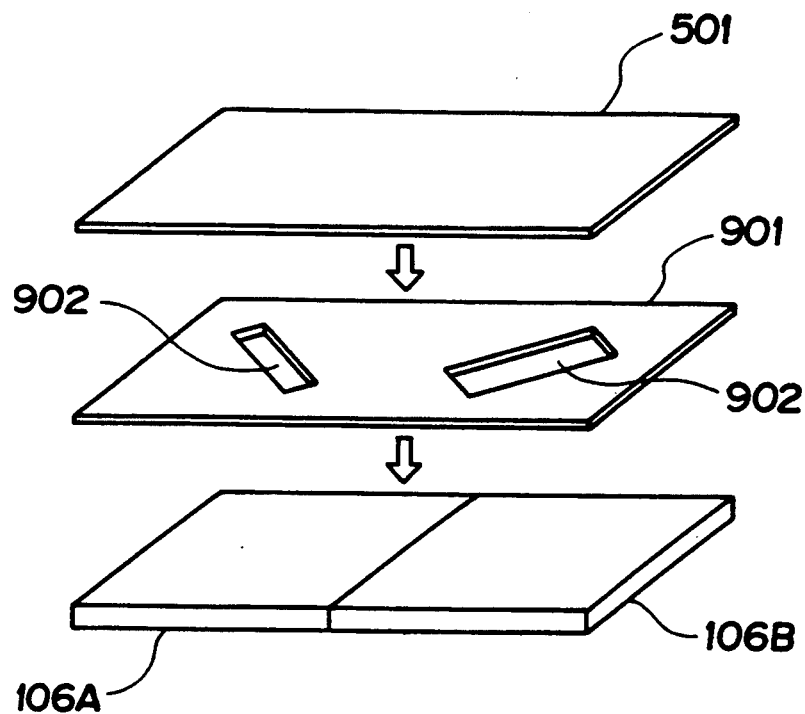
FIGS. 9(a)-9(b) show an alternative structure of the photoelectric transducers of the optical head of the present invention.
Figure 9B:
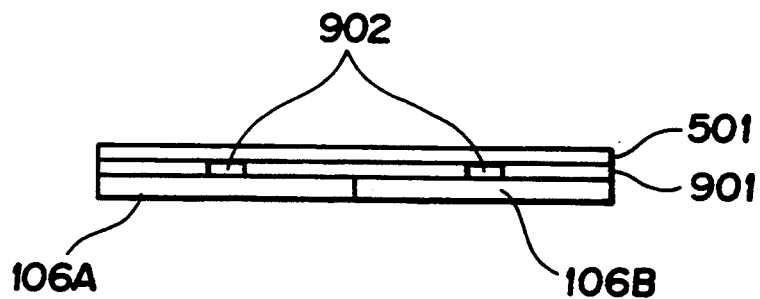

In this embodiment, although the shape of the light-receiving regions of the photoelectric transducers 106A through 106D is rectangular, the shape may be varied. For example, it is possible to employ a band shape elongated in one direction, e.g., an oval shape. Also, the shape of the light-receiving region may be a shape coincident with the photoelectric transducer. For example, as shown in FIGS. 9(a)–9(b), a light shielding mask may be used. That is, a light shielding mask 901 having openings 902 corresponding to the shape of the light-receiving regions is attached to the two photoelectric transducers 106A and 106B, and further the polarizing plate 501 is provided on the mask 901. The two photoelectric transducers 106A and 106B may be formed individually or integrally on the same substrate. Also, the above-described structure may be mounted in a package 701. FIG. 9(a) shows a structure of laminating the photoelectric transducers, the light-shielding mask and the polarizing plate. FIG. 9(b) is a cross-sectional view of FIG. 9(a).

In the above embodiment, although the photoelectric transducers 106A through 106D are packaged with the semiconductor laser 101, those elements may be packaged in a package which is different from the package for the semiconductor laser and positioned beside the package for the semiconductor laser.

(Embodiment 2)

Figure 10:
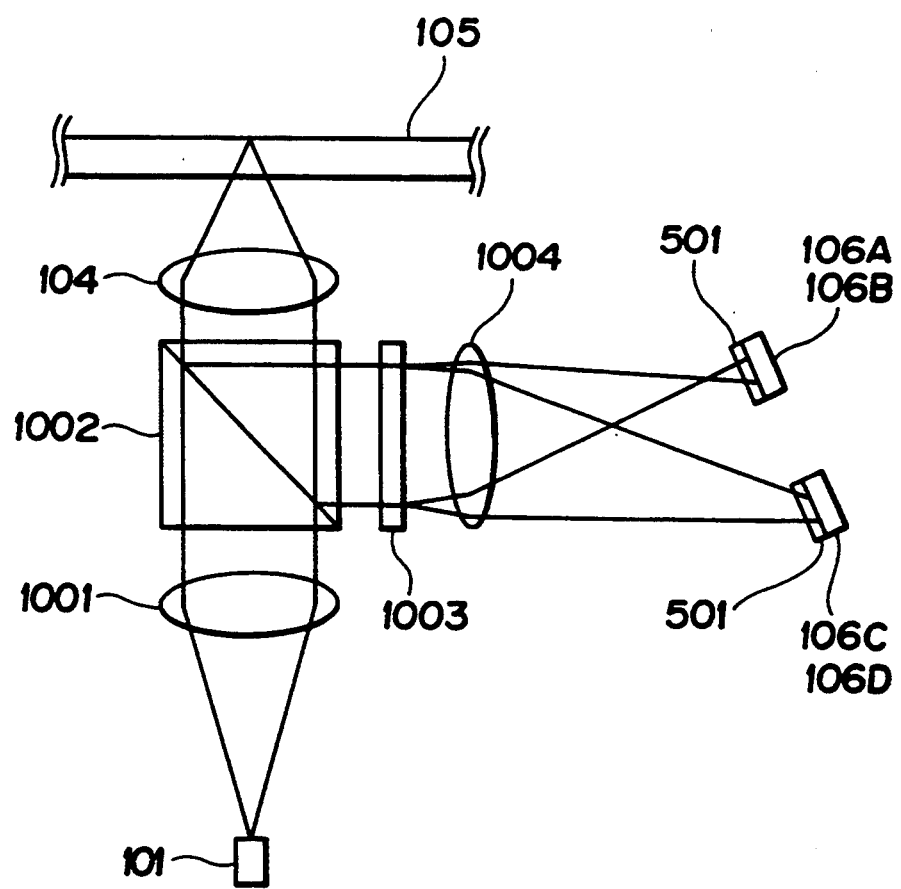
FIG. 10 is a main cross-sectional view of the optical head of a second embodiment of the present invention.

FIG. 10 is a cross-sectional view of a second embodiment of an optical head constructed according to the present invention.

As shown in the drawing, after a light beam radiated from the light source, i.e., the semiconductor laser 101, becomes a parallel beam due to a collimator lens 1001, the beam is passed through a beam splitter 1002 and condensed by the objective lens 104, and a light spot is formed on a magneto-optical recording medium as an optical recording medium. The light path of the light beam reflected by the optical recording medium 105 is changed again by the beam splitter 1002 through the objective lens to a diffraction device 1003.

The diffraction device 1003 is a phase-type diffraction grating, with the optical depth of the grating being substantially half a wavelength so as to increase the efficiency of positive first-order and negative first-order diffracted light by reducing the zero-order diffracted light as much as possible. The plane pattern of the diffraction device 1003 is similar to the pattern shown in FIG. 2. That is, the diffraction device 1003 is divided into two regions by a boundary line 201 parallel to the track on an optical recording medium 105. In FIG. 10, the boundary line 201 is parallel to the sheet surface. At each region of the diffraction device 1003 divided by the boundary line 201, chirped gratings 103A and 103B are formed of which the linear gratings increase or decrease at a predetermined pitch. The direction of the linear gratings 202 is angled at a predetermined angle with respect to the boundary line 201. The patterns of the two regions are symmetrical to each other.

Although linear gratings 202 symmetric with respect to the boundary line 201 have been described as the pattern of the chirped gratings 103A and 103B, such a pattern can be modified within the scope of the invention with the same efficiency being obtained.

By combining the respective positive first-order and negative first-order diffracted light beams in the two regions 103A and 103B of the diffraction device 103, the four diffracted light beams are received by respective ones of the four photoelectric transducers 106A, 106B, 106C and 106D.

These four photoelectric transducers 106A through 106D are located in a plane which is linearly inclined with respect to the optical axis of the zero-order diffracted light of the diffraction device 1003. The arrangement of the four photoelectric transducers 106A through 106D is the same as in the first embodiment shown in FIG. 3, and the longitudinal edge of each of the rectangular photoelectric transducers 106A through 106D is arranged radially with respect to the optical axis.

Similar to the first embodiment shown in FIG. 5, polarizing plates 501 and 502 are positioned in front of the photoelectric transducers 106A through 106D. The direction of the transmitting axis 504 of the polarizing plate 501 is angled 45° with respect to the polarizing direction 503 of the semiconductor laser beam and perpendicular to the direction 505 of the transmitting axis of the polarizing plate 502.

The four photoelectric transducers 106A through 106D are provided on an inclined substrate in the common package which is substantially same structure as shown in FIGS. 7(a)–7(b) excluding the semiconductor laser 101 and heat sink 703.

The structure of the photoelectric transducers 106A through 106D is the same as in the first embodiment described with reference to FIGS. 7, 8 and 9.

The structure of the circuit for obtaining the focusing error signal and the tracking error signal is the same as in the first embodiment shown in FIGS. 5 and 6.

(Embodiment 3)

Figure 11:
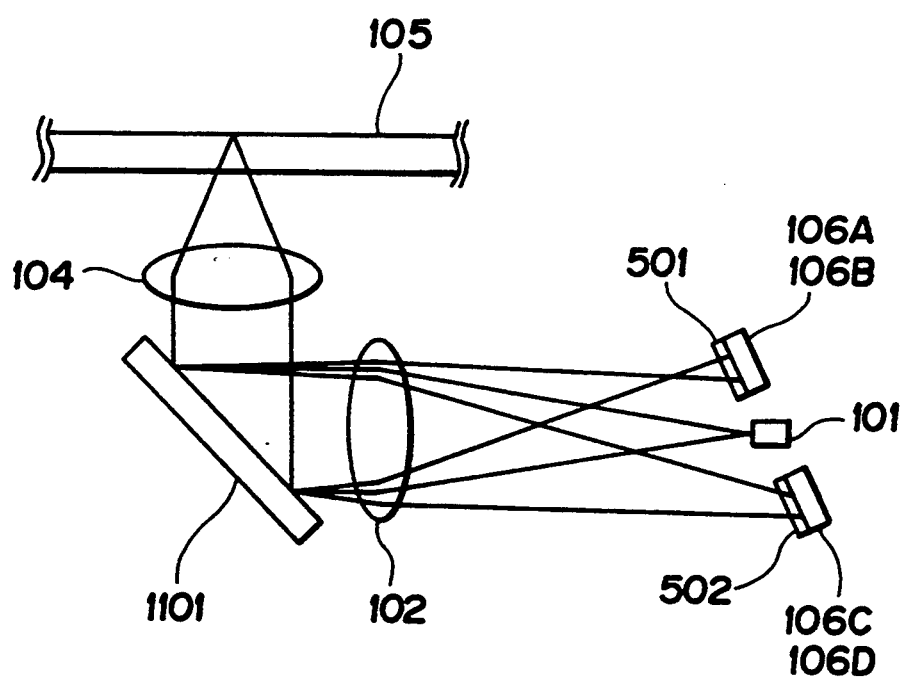
FIG. 11 is a main cross-sectional view of the optical head of a third embodiment of the present invention.

FIG. 11 is a cross-sectional view of a third embodiment of an optical head according to the present invention.

After a light beam radiated from the semiconductor laser 101 acting as a light source is converted to a parallel ray by a positive lens 102, the beam is reflected by a reflecting type diffraction device 1101 and condensed by an objective lens 104, whereby a light spot is formed on an optical recording medium 105. The light beam reflected by the optical recording medium 105 arrives at the reflecting type diffraction device 1101 again through the objective lens 104.

The reflecting-type diffraction device 1101 is divided into two regions by a boundary line 201 parallel to the track on the optical recording medium 105. In FIG. 11, the boundary line 201 is parallel to the sheet surface.

The arrangement of the semiconductor laser 101 and the photoelectric transducers 106A through 106D, the method for detecting the focusing and error signals, and the signal processing circuit are the same as in the first embodiment.

(Embodiment 4)

Figure 12:
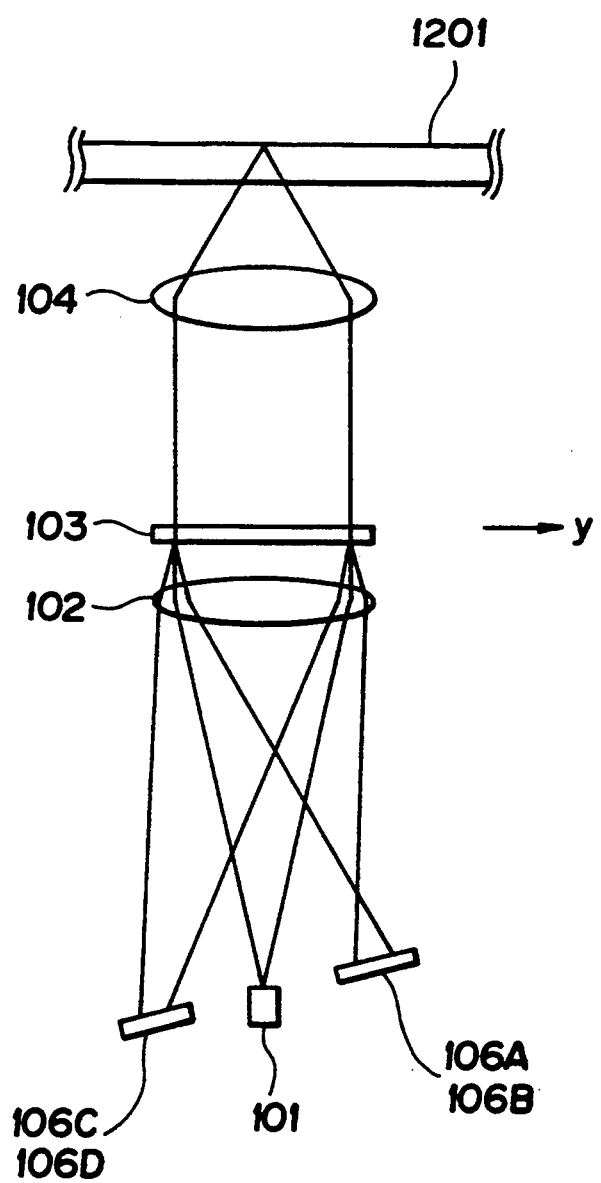
FIG. 12 is a main cross-sectional view of the optical head of a fourth embodiment of the present invention.

FIG. 12 is a cross section view of a fourth embodiment of an optical head of the present invention. The optical recording medium 1201 is a phase-change-type recording medium.

After a light beam radiated from the semiconductor laser 101 acting as a light source is converted to a parallel ray by a positive lens 102, and the beam is passed through the diffraction device 103 and condensed by an objective lens 104 to form a light spot on an optical recording medium 1201. The light beam reflected by the optical recording medium 1201 arrives at the diffraction device 103 again through the objective lens 104.

The diffraction device 103 is a phase-type diffraction grating, and the structure thereof is the same as in the first embodiment shown in FIG. 2.

By combining the respective positive first-order and negative first-order diffracted light in the two regions 103A and 103B of the diffraction device 103, the four diffracted light beams are received by four photoelectric transducers 106A, 106B, 106C and 106D.

These four photoelectric transducers 106A through 106D are located in a plane which is linearly inclined with respect to the optical axis extending from the semiconductor laser 101 to the objective lens 104, as in the first embodiment. As shown in an arrangement of photoelectric transducers in a view from the diffraction device in FIG. 3, the longitudinal axis of each rectangular photoelectric transducer is arranged radially with respect to the optical axis.

A difference, however, from the first embodiment is that no polarizing plate is provided in front of the photoelectric transducers 106A through 106D.

A packaged structure of the semiconductor laser 101 and the photoelectric transducers is arranged as shown in FIGS. 7(a) and 7(b), excluding the polarizing plates 501 and 502. The embodiment can be applied to a structure as shown in FIGS. 8 and 9(a)–9(b), unless the polarizing plates 501 and 502 are desired.

Figure 13:
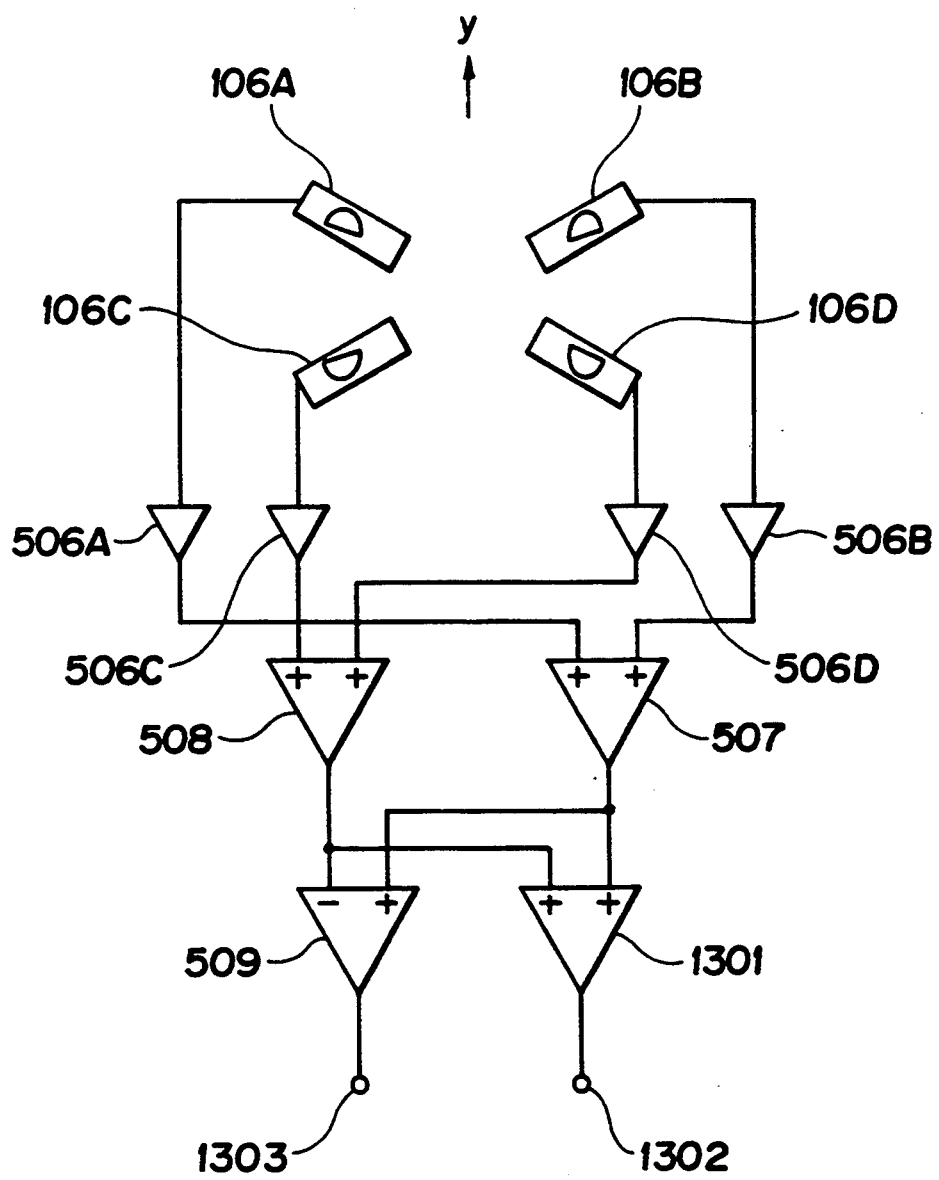
FIG. 13 shows a signal processing circuit of light-intensity-modulated reproduced signal and focusing error signal of the optical memory device of the fourth embodiment of the present invention.
Figure 14:
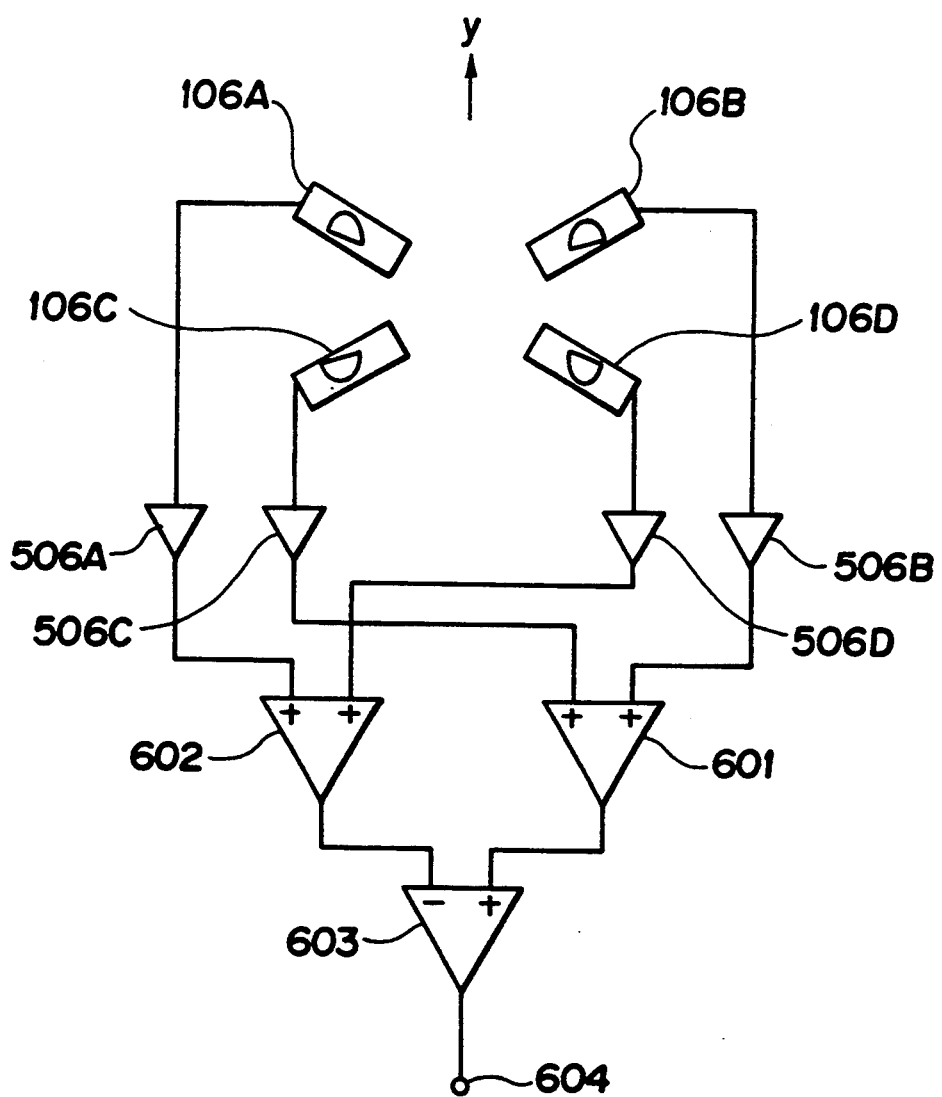
FIG. 14 is a circuit diagram showing a signal processing circuit for the tracking error signal of the optical memory device of the fourth embodiment of the present invention.

FIGS. 13 and 14 show a signal processing circuit in an optical memory device employing the optical head of the above embodiment.

A signal processing circuit for obtaining a focusing error signal and a light-intensity-modulated signal indicating information recorded on the recording medium will first be explained. As shown in the drawings, an output of four photoelectric transducers 106A, 106B, 106C and 106D is a current/voltage converted by low-noise wideband preamplifiers 506A, 506B, 506C and 506D, respectively. Signals from the photoelectric transducers 106A and 106B are added with an adder 507, and signals from the photoelectric transducers 106C and 106D are added with an adder 508. The outputs from the two adders 507 and 508 are input to an adder 1301. By calculating the total sum of the outputs from the four photoelectric transducers 106A through 106D, the light-intensity-modulated reproducing signal 1302 is obtained. On the other hand, the outputs from the two adder 507 and 508 are applied to a subtractor 509 and a focusing error signal 1303 is obtained as a difference signal.

FIG. 14 shows a signal processing circuit for obtaining a tracking error signal. (This drawing excludes the polarizing plates 501 and 502 from the circuit as shown in FIG. 6.) A description of the signal processing circuit is omitted since the signal processing circuit is the same as in the first embodiment shown in FIG. 6.

An objective lens actuator is driven according to the error signal obtained by the above method.

In the above embodiment, although a phase-change-type recording medium is used as the optical recording medium, the invention is applicable to a recording medium capable of reproducing the information stored on the recording medium by modulating light intensity employing an optical head and an optical memory device according to the present invention.

It is possible also to employ a structure as shown in FIGS. 10 and 11.

(Embodiment 5)

Figure 15:
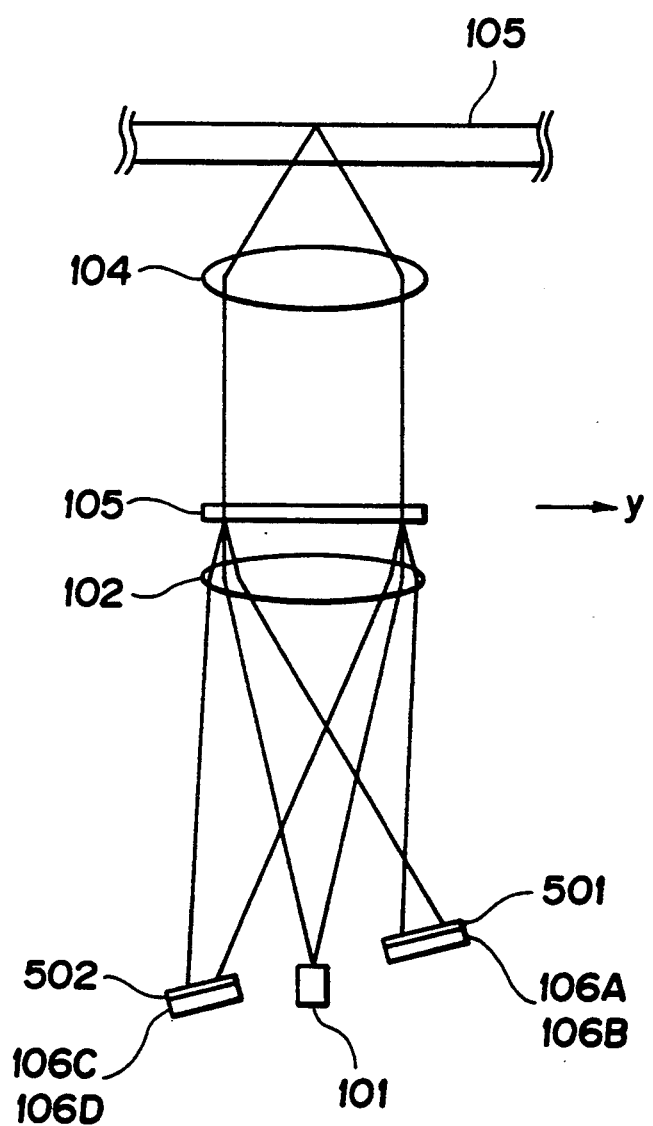
FIG. 15 is a main cross-sectional view of the optical head of a fifth embodiment of the present invention.

FIG. 15 is a main cross-sectional view of a fifth embodiment of an optical head according to the present invention.

Although the optical head of the fifth embodiment is basically same as the optical head of the first embodiment shown in FIG. 1, the grating pattern of chirped gratings 1501A and 1501B for forming a diffraction device 1501 is different from that of the first embodiment.

Figure 16:
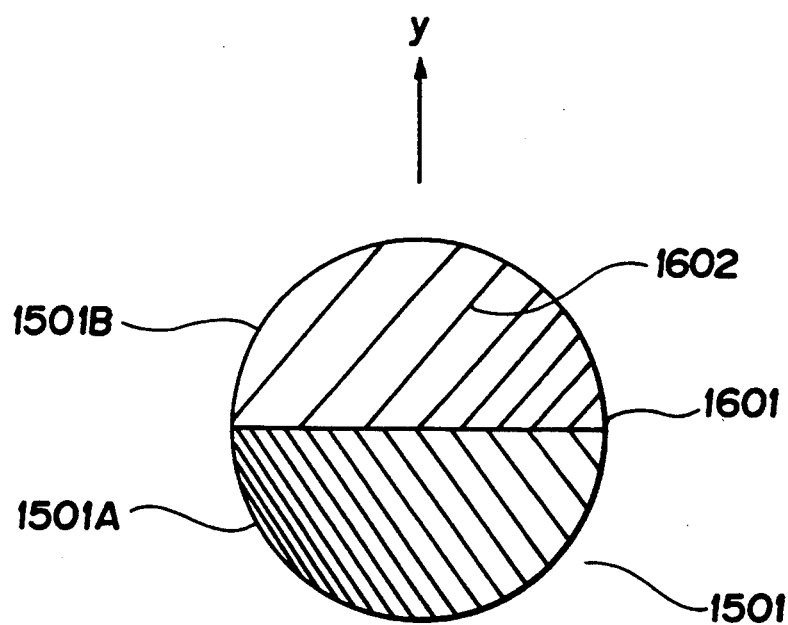
FIG. 16 is a plan view of the diffraction device used in the optical head of the fifth embodiment of the present invention.

FIG. 16 shows a plane grating pattern of a diffraction device 1501 according to the fifth embodiment. The diffraction device 1501 is divided into two chirped grating regions 1501A and 1501B by a boundary 1601. The boundary line 1601 is parallel to the track of an optical recording medium 105 (perpendicular to the sheet surface in FIG. 15). Each of the grating regions 1501A and 1501B is formed by linear gratings 1602 of which the period increases or decreases at a predetermined pitch. The direction of these linear gratings 1602 is angled a predetermined degree with respect to the boundary line 1601 and rotated about 20° between the two regions 1501A and 1501B. In FIG. 16, the degree of inclination is exaggerated.

As shown in FIG. 19, the grating pattern of the chirped grating region 1501A is the same as the lower half side of a diffraction device 1901 having a grating pattern 1902 changing in period in one direction and clockwise rotated by 10°. The pattern of the other chirped grating region 1501B is the same as the upper half side of the diffraction device 1901, as shown in FIG. 19, counterclockwise rotated by 10°. In the drawing, the degree of inclination is exaggerated.

By combining respective positive first-order and negative first-order diffracted light beams from the two regions 1501A and 1501B of the diffraction device 1501, four diffracted light beams are received at four photoelectric transducers 106A, 106B, 106C and 106D.

Figure 17:
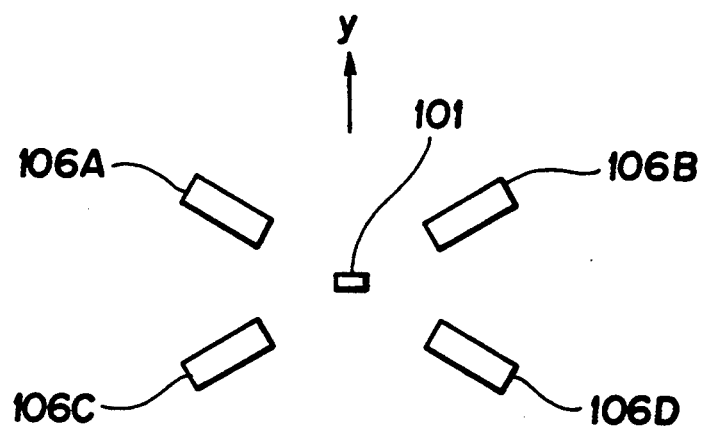
FIG. 17 shows the arrangement of photoelectric transducers and a semiconductor laser of the optical head of the fifth embodiment of the present invention.
Figure 18:
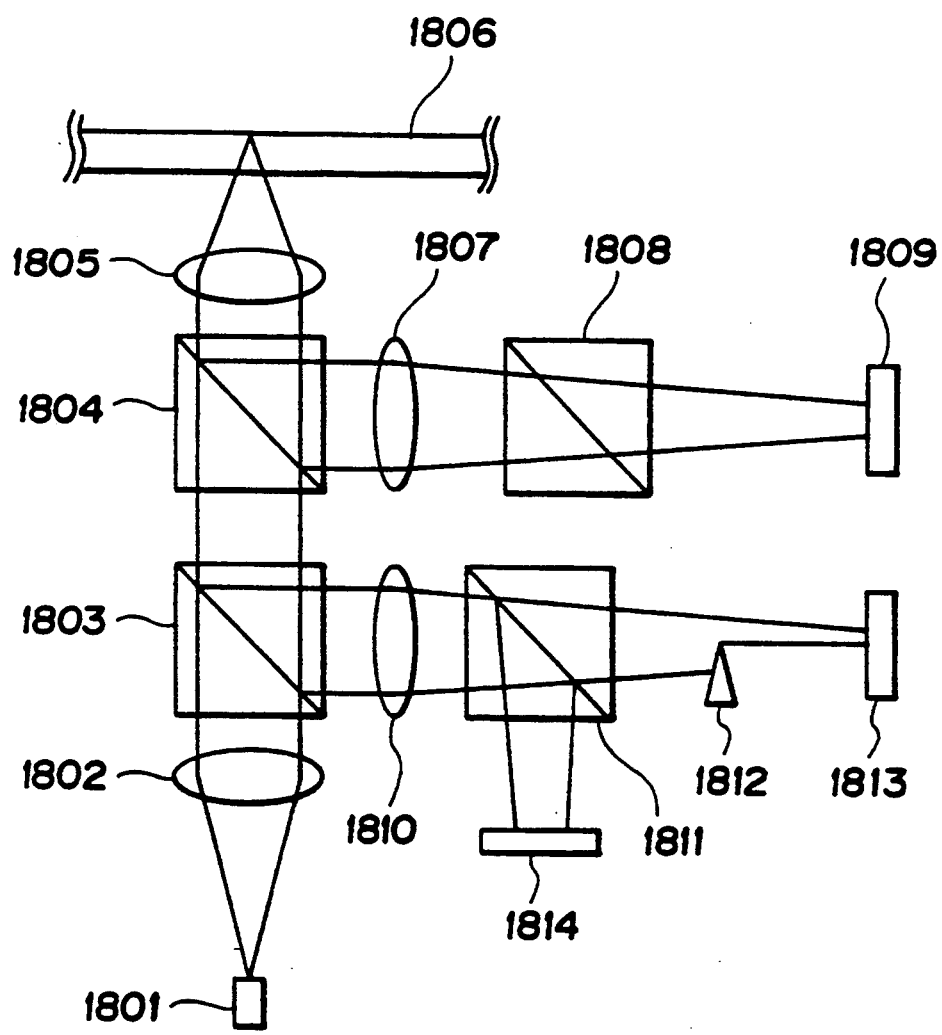
FIG. 18 shows a conventional optical head.

These four photoelectric transducers 106A through 106D are positioned in a plane linearly inclined with respect to the optical axis from the semiconductor laser 101 to the objective lens and y axis. As seen in FIG. 17, which shows the arrangement of the photoelectric transducers 106A through 106D in a view from the side of the diffraction device 1501, the longitudinal axes of the rectangular photoelectric transducers are arranged radially with respect to the optical axis.

As shown in FIG. 15, the polarizing plates 501 and 502 are provided in front of the photoelectric transducers. As in the first embodiment, the direction of the transmitting axis of the polarizing plate 501 is angled 45° with respect to the polarizing direction of the semiconductor laser beam and perpendicular to the direction of the transmitting axis of the polarizing plate 502.

For the optical head, it is possible to employ a structure as shown in FIGS. 10 and 11 by using a diffraction device having a grating pattern formed according to the embodiment shown in FIG. 16. It is possible to employ a structure as shown in FIG. 12 as a phase-change-type recording medium.

This embodiment is also applicable to the structure of the above-described embodiments 1 and 2 as a package of the photoelectric transducers or the semiconductor laser and the photoelectric transducers.

Utilizing the signal processing circuit as shown in FIGS. 5 and 6, it is possible to obtain a magneto-optical reproducing signal, a focusing error signal and a tracking error signal similar to the first embodiment in constructing an optical memory device.

(Embodiment 6)

FIG. 20 through FIG. 28 show a sixth embodiment of the present invention. The structure of this embodiment is basically the same as the first embodiment, except for the inclined plane for the photoelectric transducers 106A through 106D and the grating pattern of the diffraction device 103.

The sixth embodiment is the same as the first embodiment as far as the photoelectric transducers 106A through 106D are positioned in a linearly inclined plane with respect to the optical axis extending from the semiconductor laser 101 and an objective lens 104. However, in the sixth embodiment, the surfaces of the photoelectric transducers 106A though 106D are arranged in a stepped condition along the optical axis and perpendicular to the optical axis. Moreover, in the sixth embodiment, although the photoelectric transducers 106A through 106D are arranged generally as described above, the photoelectric transducers 106A through 106D are arranged within the circle of least confusion of the diffracted light for generating astigmatism by a combination of the chirped gratings 103A and 103B and the positive lens 102, so that the respective positive first-order and negative first-order diffracted light beams at the two chirped grating regions of the diffraction device 103, that is, four diffracted light beams, are received at the four photoelectric transducers 106A, 106B, 106C and 106D.

Figure 26A:
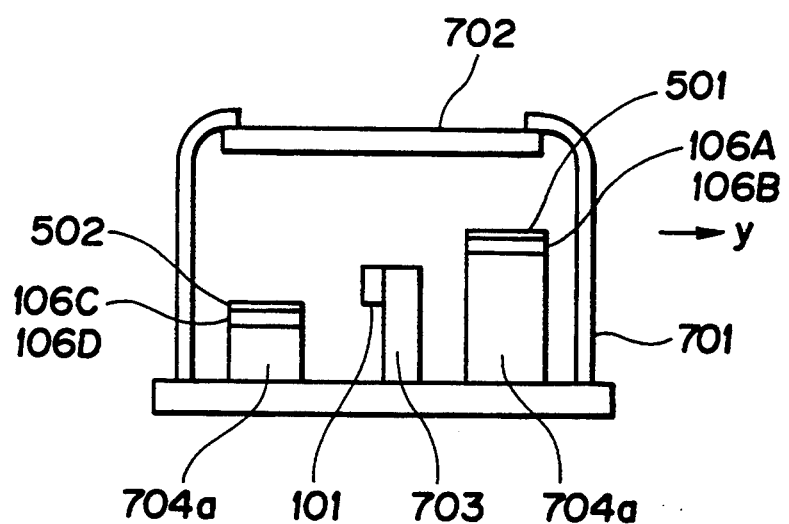
FIGS. 26(a)-26(b) show the structure of the photoelectric transducers and the semiconductor laser of the optical head of the sixth embodiment of the present invention.
Figure 26B:
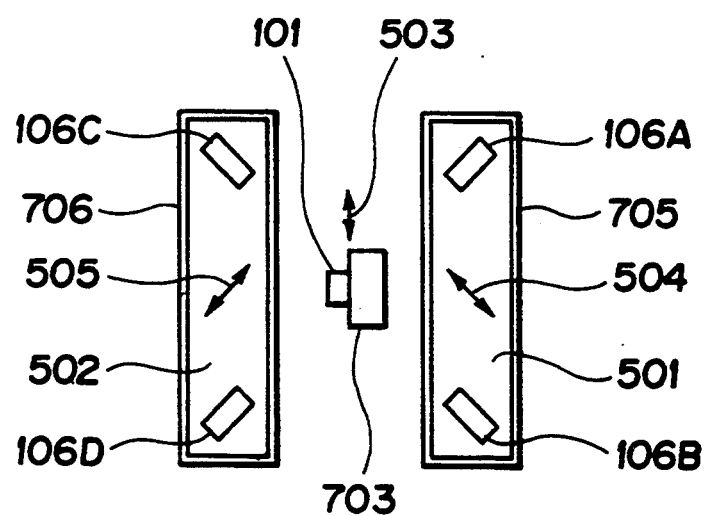

Particularly, it becomes easy to produce the above described structure. For example, as shown in FIGS. 26(a)–26(b), the various elements are packaged in a package 701 having a window 702. That is, as shown in FIGS. 26(a)–26(b), the semiconductor laser 101 is attached to the heat sink 703, the photoelectric transducers 106A and 106B are formed on the same substrate 705, and a polarizing plate 501 is provided over the elements. On the other hand, the photoelectric transducers 106C and 106D are formed on the same substrate 706 and a polarizing plate 502 is provided over the elements. The respective substrates 705 and 706 are mounted on a straight substrate 704a.

Figure 27:
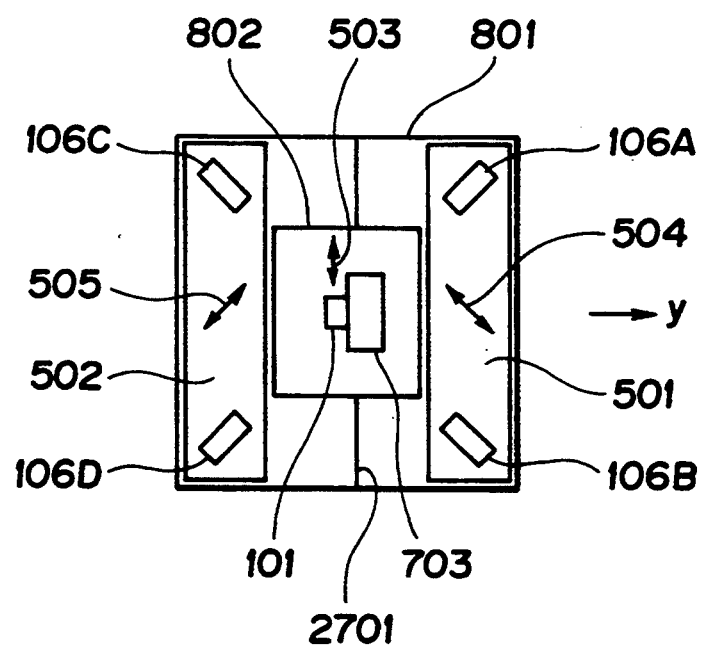
FIG. 27 shows alternative photoelectric transducers of the optical head of the present invention.
Figure 28A:
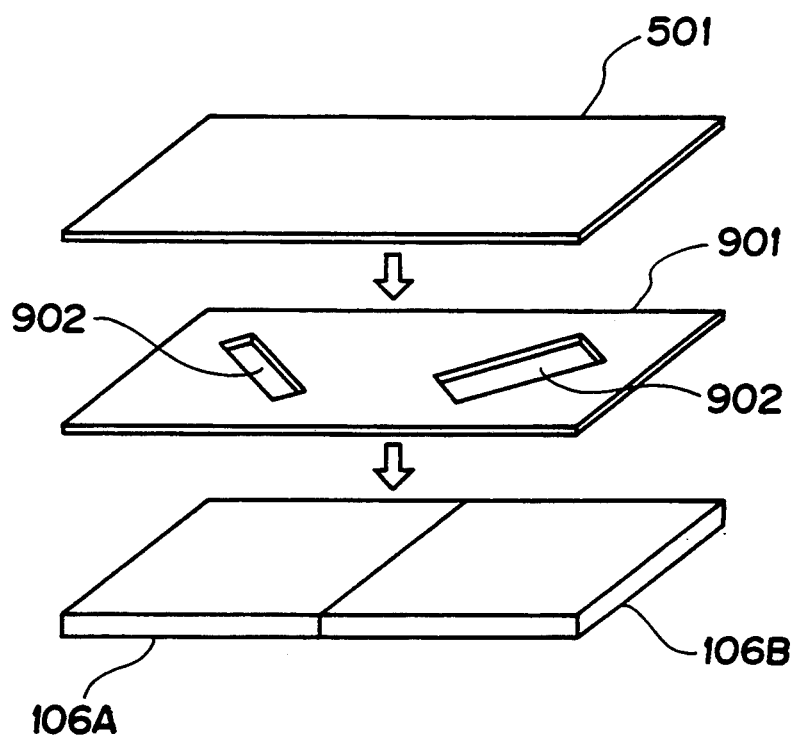
FIG. 28(a)-28(b) show different photoelectric transducers of the optical head of the present invention.
Figure 28B:
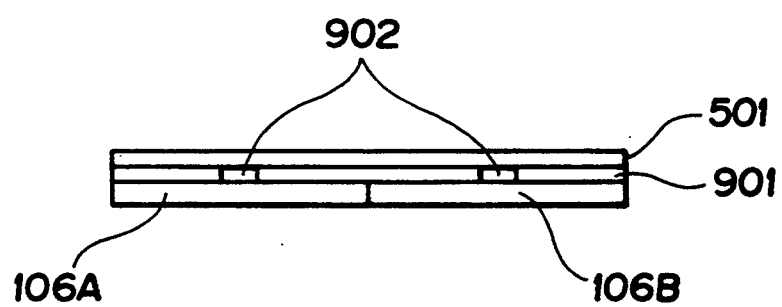

Other arrangements of the photoelectric transducers are also possible. For example, as shown in FIG. 27, the four photoelectric transducers 106A, 106B, 106C and 106D are formed on the same substrate 801, a polarizing plate 501 is provided on the photoelectric transducers 106A and 106B, and a polarizing plate 502 is provided over the photoelectric transducers 106C and 106D. A step 2701 is provided in a middle portion of the substrate 801, and an opening 802 is formed at a central portion by etching the substrate. The semiconductor laser 101 is mounted in the opening.

(Embodiment 7)

Figure 29A:
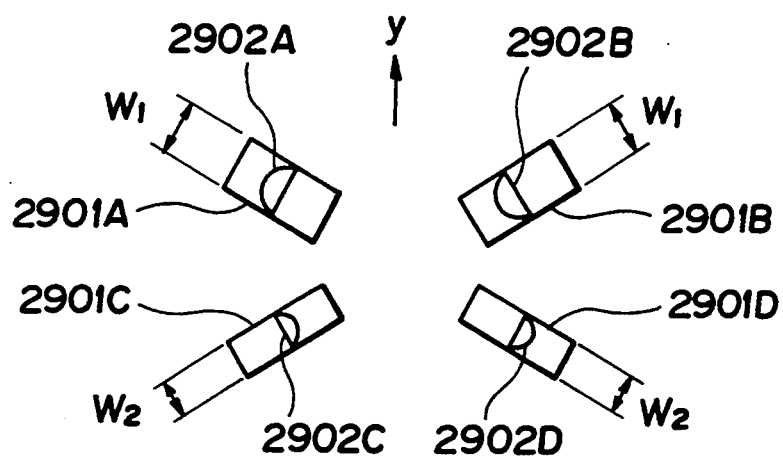
FIGS. 29(a)-29(c) show a seventh embodiment of the present invention, wherein the width of the photoelectric transducers is coincident with the width of an irradiated light spot in the focused condition.
Figure 29B:
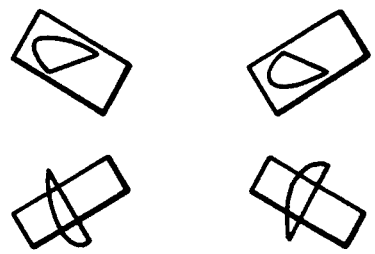
Figure 29C:
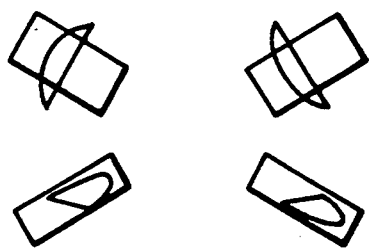

FIGS. 29(a)–29(c) show the arrangement of the photoelectric transducers 2901A, 2901B, 2901C and 2901D of the seventh embodiment of an optical head according to the present invention. The optical system of the seventh embodiment is the same as the embodiment described with reference to FIGS. 1 and 2, except for the photoelectric transducers. The structure of the signal detecting system is the same as in the system shown in FIGS. 5 and 6. By detecting the shape of the circle of least confusion of diffracted light by a diffraction device employing a ray-tracing technique, the width of the positive first-order diffracted light may be increased:

$$W1 > W2,$$

wherein W1 is the width of the positive first-order diffracted light (2902A, 2902B), and W2 is the width of the negative first-order diffracted light (2902C, 2902D).

In other words, when the objective lens of the optical head is focussed on the recording medium, the width W1 of light spots 2902A and 2902B of the positive first-order diffracted light on the photoelectric transducers is wider than the width W2 of the light spots 2902C and 2902D of the negative first-order diffracted light on the photoelectric transducer. Accordingly, as shown in FIG. 29(a), it is possible to obtain certain highly sensitive error signals and magneto-optical signals by controlling the width of the respective photoelectric transducers 2901A, 2901B, 2901C and 2901D coincident with the width of the light spot in the focussed condition. For example, the width of the photoelectric transducer of this embodiment can be determined as follows:

width W1 of positive first-order diffracted light (2901A, 2901B) = 95 μm, width W2 of negative first-order diffracted light (2901C, 2901D) = 80 μm.

FIG. 29(b) shows the condition of the light spots in the case the recording medium is too far away from the objective lens, FIG. 29(c) shows the condition of the light spots in the case where the recording medium is too near the objective lens.

Figure 32:
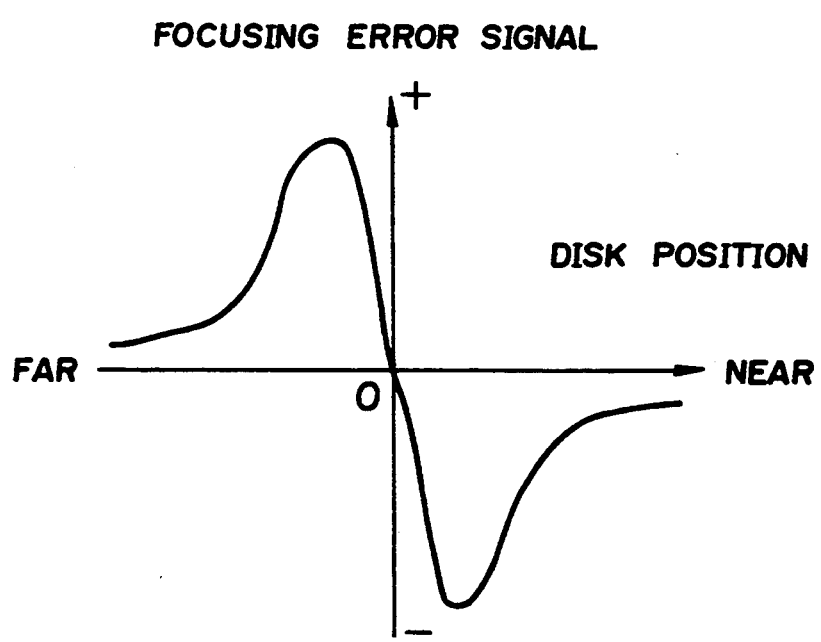
FIG. 32 is a graph showing the relation between the focusing error signal and the focused point.

As shown in FIGS. 29(a)–29(c), the focusing error signals as shown in FIG. 32 can be obtained by changing the width of the photoelectric transducer corresponding to the width of the light spot. As shown in FIG. 32, the focusing error signal becomes zero only at the time when the focusing point is on the recording medium. If the focusing point moves to one side or the other, the focusing error signal becomes minus or plus. "Near" and "Far" in FIGS. 29(a)–29(c) indicate, respectively, a focusing point too near the objective lens and a focusing point moved too far from the objective lens. "O" indicates a correct focus point.

Next, the difference of the width of the photoelectric transducers from the widths of the positive first-order diffracted light (2902A, 2902B) and the negative first-order diffracted light (2902C, 2902D) will be discussed with reference to FIGS. 30(a)–30(c) through 34.

Figure 30A:
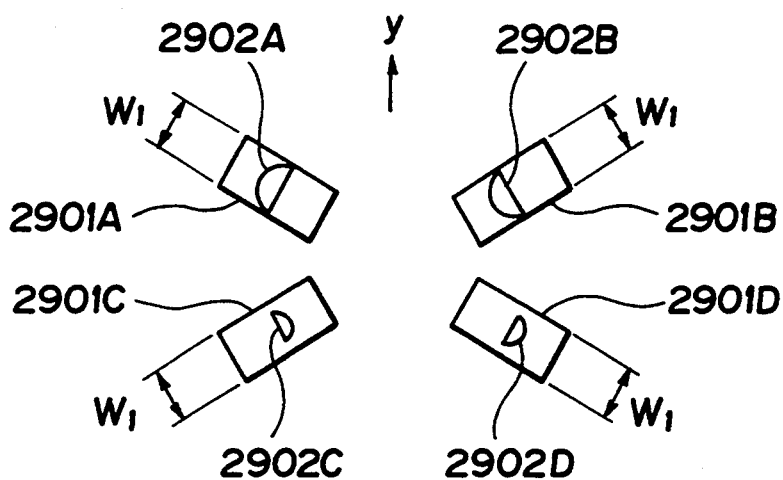
FIGS. 30(a)-30(c) show an optical head, for purposes of a comparison of the present invention, wherein the width of the photoelectric transducers is different from the width of light spot in the focused condition.
Figure 30B:
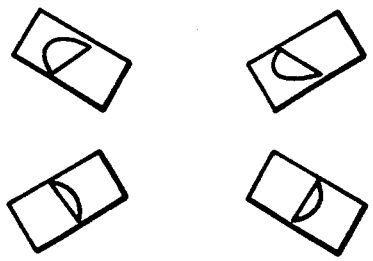
Figure 30C:
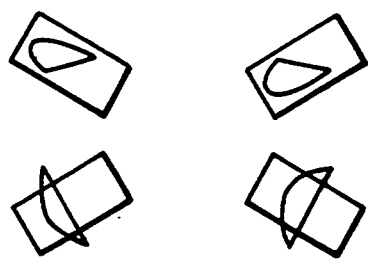

In FIG. 30, the width W1 of the photoelectric transducers 2901C and 2901D for receiving the negative first-order diffracted light is wider than the width of the light spots 2902C and 2902D. FIG. 30(a) shows the focussed condition. FIGS. 30(b) and 30(c) shows a light spot in the case where the recording medium is moved away from the objective lens. In FIG. 30(b), the recording medium is moved slightly. The width of the photoelectric transducers 2901C and 2901D receiving the negative first-order diffracted light is wider than the width of the light spot in the focussed condition, so that the light spots 2901C and 2901D of the negative first-order diffraction order do not fade out from the photoelectric transducers. On the other hand, as described above, the focusing error signal is calculated by subtracting the sum of the output from the photoelectric transducers (2901C, 2901D) receiving the negative first-order diffracted light from the sum of the outputs from the photoelectric transducers (2901A, 2901B) receiving the positive first-order diffracted light, so that the focusing error signal is zero for the condition shown in FIG. 30(b).

If the recording medium is moved further away from the condition shown in FIG. 30(b), the light spot becomes as shown in FIG. 30(c), and hence the negative first-order diffracted light beams (2902C, 2902D) fade out from the photoelectric transducers, in which case the obtained focusing error signal is not zero.

Figure 33:
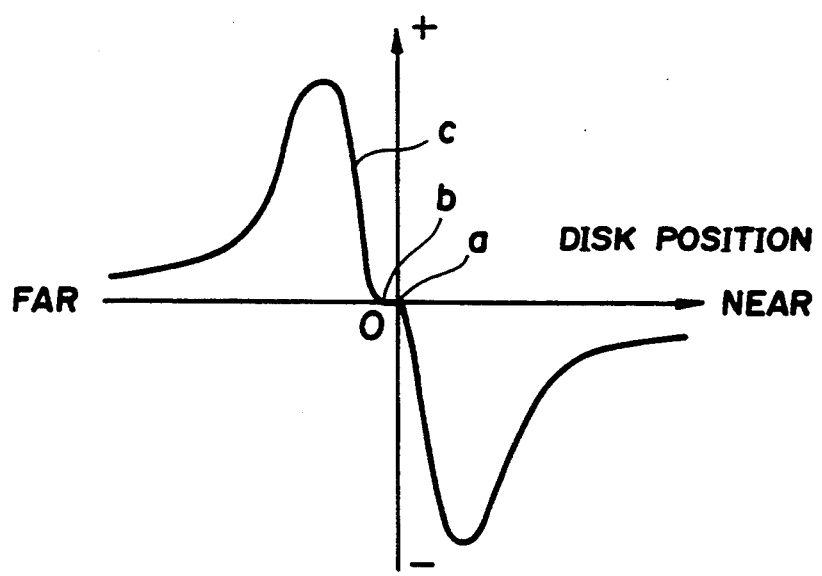
FIG. 33 is a graph showing the relation between the focusing error signal and the focusing point of the optical head as shown in FIG. 30.

FIG. 33 shows the focusing error signal in the case where the width of the photoelectric transducer receiving the negative first-order diffracted light is the same as the width of the light spots of the positive first-order diffracted light, as shown in FIG. 30. Symbols a, b and c in FIG. 33 correspond to conditions as shown in FIG. 30(a), FIG. 30(b) and FIG. 30(c), respectively. As clearly shown in FIG. 33, if the width of the photoelectric transducers 2901C and 2901D receiving the negative first-order diffracted light is the same as the width of the photoelectric transducers 2901A and 2901B receiving the positive first-order diffracted light, there will exist a region where a correct focusing error signal cannot be obtained, even if the disk is moved.

Figure 31:
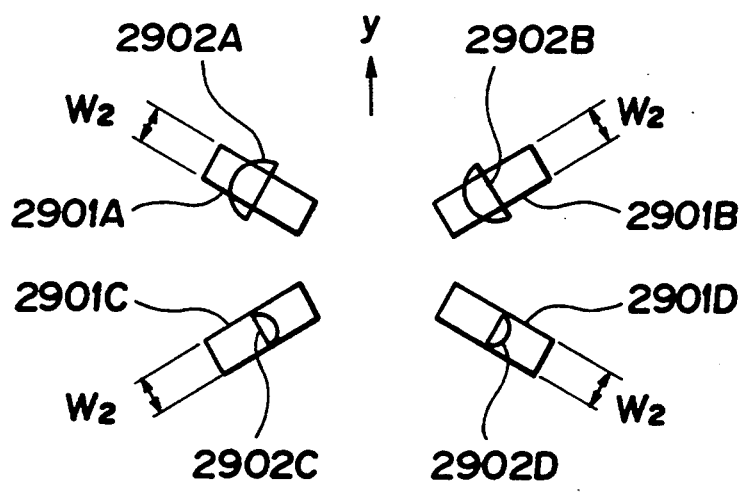
FIG. 31 shows an optical head, for purposes of a comparison of the present invention, wherein the width of the photoelectric transducers is different from the width of light spot in the focused condition.
Figure 34:
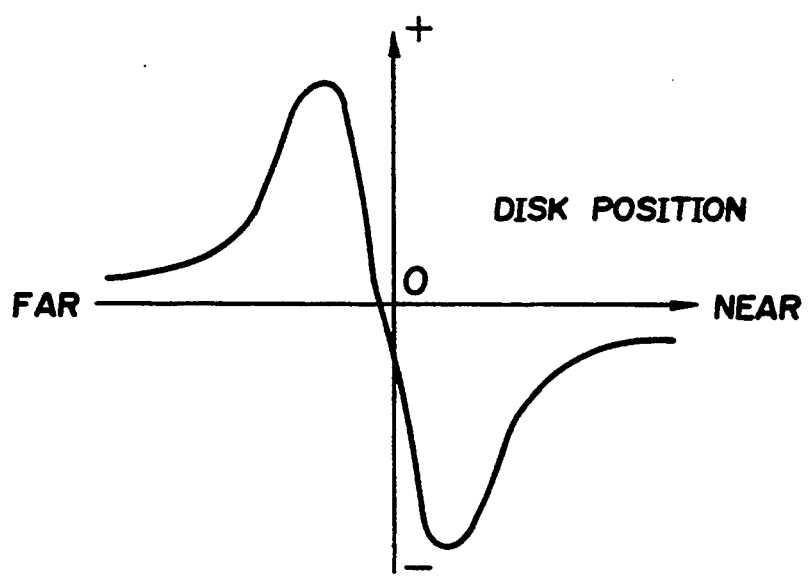
FIG. 34 is a graph showing a relation between the focusing error signal and the focusing point of the optical head as shown in FIG. 31.

Subsequently, the coincidence of the width of the photoelectric transducers 2901A and 2901B receiving the positive first-order and the width W2 of the photoelectric transducers 2901C and 2901D receiving the negative first-order diffracted light will be discussed. FIG. 31 shows a focusing condition. In this case, the size of the light spots 2902A and 2902B of the positive first-order diffracted light is greater than the width W2 of the photoelectric transducers 2901A and 2901B, and hence a focusing error signal is produced. FIG. 34 shows the focusing error signal. As shown in FIG. 34, even if the amount of shift of the disk is zero, the focusing error signal is negative, and thus an incorrect error signal is produced.

As described above, by setting the width of the photoelectric transducers coincident with the size of the light spots of the positive first-order diffracted light and the negative first-order diffracted light, a correct focusing error signal is obtained. Regarding the magneto-optical signal, the signal can be obtained from the difference signal of the outputs obtained from the photoelectric transducers. It is preferable to select the width of the photoelectric transducer corresponding to the size of light spots.

As described above, it is possible to utilize a coherent light source or a second-harmonic generation device as the light source, in addition to the semiconductor laser.

As described above, according to the present invention, the only optical member required for detecting the signal is a diffraction device. Thus, the optical head can be small in size. Particularly, it is necessary only for the diffraction device and polarizing plates to detect signals from the magneto-optical recording medium, so that the optical members can be omitted and expensive polarizing optical members are unnecessary, and a small and low price optical head can be provided. According to the present invention, the shape of the photoelectric transducers is symmetrical and it is possible to reproduce clear signals with respect to high frequency signals. When the information of the recording medium is reproduced, the focusing error signal is obtained and the tracking error signal is obtained. All signals from the four photoelectric transducers are utilized, so that the light beams are not wasted. Further, the longitudinal directions of the band-shaped photoelectric transducers are arranged perpendicular to the direction of the grating grooves of the diffraction grating constituting the diffraction device, so that there is no influence upon signal detection, even if the wavelength of the light source is changed, since the light spot of the diffracted light is shifted in the longitudinal direction of the photoelectric transducers.

What is claimed is:

1. An optical memory device comprising:
  a positive lens;
  a diffraction grating having a first grating region and a second grating region partitioned by a partition line parallel to a track of an optical recording medium, spacing for grooves of the grating pattern being varied in each of said grating regions, and dividing light beam from said optical recording medium into at least four diffracted beams, astigmatism being generated in each of said diffracted beams in cooperation with said positive lens;
  a single, non-partitioned first photoelectric transducer receiving a positive first order diffracted beam produced by said first grating region, said first photoelectric transducer being disposed at a position of a least circle of confusion of said positive first order diffracted beam produced by said first grating region;
  a single, non-partitioned second photoelectric transducer receiving a positive first order diffracted beam produced by said second grating region, said second photoelectric transducer being disposed at a position of a least circle of confusion of said positive first order diffracted beam produced by said second grating region;
  a single, non-partitioned third photoelectric transducer receiving a negative first order diffracted beam produced by said first grating region, said third photoelectric transducer being disposed at a position of a least circle of confusion of said negative first order diffracted beam produced by said first grating region;
  a single, non-partitioned fourth photoelectric transducer receiving a negative first order diffracted beam produced by said second grating region, said fourth photoelectric transducer being disposed at a position of a least circle of confusion of said negative first order diffracted beam produced by said second grating region;
  focusing servo means for effecting focusing in response to a difference signal between a sum of outputs from said first photoelectric transducer and said second photoelectric transducer and a sum of outputs from said third photoelectric transducer and said fourth photoelectric transducer; and
  tracking servo means for effecting tracking in response to a difference signal between a sum of outputs from said first photoelectric transducer and said third photoelectric transducer and a sum of outputs from said second photoelectric transducer and said fourth photoelectric transducer.

2. An optical memory device comprising:
  a positive lens;
  a diffraction grating having a first grating region and a second grating region partitioned by a partition line parallel to a track of a magneto-optical recording medium, spacing for grooves of the grating pattern being varied in each of said grating regions, and dividing light beam from said magneto-optical recording medium into at least four diffracted beams, astigmatism being generated in each of said diffracted beams in cooperation with said positive lens;
  a single, non-partitioned first photoelectric transducer receiving a positive first order diffracted beam produced by said first grating region, said first photoelectric transducer being disposed at a position of a least circle of confusion of said positive first order diffracted beam produced by said first grating region;

a single, non-partitioned second photoelectric transducer receiving a positive first order diffracted beam produced by said second grating region, said second photoelectric transducer being disposed at a position of a least circle of confusion of said positive first order diffracted beam produced by said second grating region;

a single, non-partitioned third photoelectric transducer receiving a negative first order diffracted beam produced by said first grating region, said third photoelectric transducer being disposed at a position of a least circle of confusion of said negative first order diffracted beam produced by said first grating region;

a single, non-partitioned fourth photoelectric transducer receiving a negative first order diffracted beam produced by said second grating region, said fourth photoelectric transducer being disposed at a position of a least circle of confusion of said negative first order diffracted beam produced by said second grating region;

a first analyzer provided in front of said first photoelectric transducer and said second photoelectric transducer, a transmitting axis of said first analyzer being angled almost 45° with respect to a polarizing direction of a light source;

a second analyzer provided in front of said third photoelectric transducer and said fourth photoelectric transducer, a transmitting axis of said second analyzer being perpendicular to said transmitting axis of said first analyzer;

focusing servo means for effecting focusing in response to a difference signal between a sum of outputs from said first photoelectric transducer and said second photoelectric transducer and a sum of outputs from said third photoelectric transducer and said fourth photoelectric transducer;

tracking servo means for effecting tracking in response to a difference signal between a sum of outputs from said first photoelectric transducer and said third photoelectric transducer and a sum of outputs from said second photoelectric transducer and said fourth photoelectric transducer; and magneto-optical reproducing means for obtaining a magneto-optical reproduced signal from a high frequency component of a difference signal between a sum of outputs from said first photoelectric transducer and said second photoelectric transducer and a sum of outputs from said third photoelectric transducer and said fourth photoelectric transducer.

3. An optical memory device comprising:
an optical head comprising:
a positive lens;
a diffraction grating having a first grating region and a second grating region partitioned by a partition line parallel to a track of an optical recording medium, spacing for grooves of the grating pattern being varied in each of said grating regions, and dividing light beam from said optical recording medium into at least four diffracted beams, astigmatism being generated in each of said diffracted beams in cooperation with said positive lens;

a single, non-partitioned first photoelectric transducer receiving a positive first order diffracted beam produced by said first grating region, said first photoelectric transducer being disposed at a position of a least circle of confusion of said positive first order diffracted beam produced by said first grating region;

a single, non-partitioned second photoelectric transducer receiving a positive first order diffracted beam produced by said second grating region, said second photoelectric transducer being disposed at a position of a least circle of confusion of said positive first order diffracted beam produced by said second grating region;

a single, non-partitioned third photoelectric transducer receiving a negative first order diffracted beam produced by said first grating region, said third photoelectric transducer being disposed at a position of a least circle of confusion of said negative first order diffracted beam produced by said first grating region;

a single, non-partitioned fourth photoelectric transducer receiving a negative first order diffracted beam produced by said second grating region, said fourth photoelectric transducer being disposed at a position of a least circle of confusion of said negative first order diffracted beam produced by said second grating region;

focusing servo means for effecting focusing in response to a difference signal between a sum of outputs from said first photoelectric transducer and said second photoelectric transducer and a sum of outputs from said third photoelectric transducer and said fourth photoelectric transducer; and tracking servo means for effecting tracking in response to a difference signal between a sum of outputs from said first photoelectric transducer and said third photoelectric transducer and a sum of outputs from said second photoelectric transducer and said fourth photoelectric transducer.

4. An optical memory device comprising:
an optical head comprising:
a positive lens;
a diffraction grating having a first grating region and a second grating region partitioned by a partition line parallel to a track of a magneto-optical recording medium, spacing for grooves of the grating pattern being varied in each of said grating regions, and dividing light beam from said magneto-optical recording medium into at least four diffracted beams, astigmatism being generated in each of said diffracted beams in cooperation with said positive lens;

a single, non-partitioned first photoelectric transducer receiving a positive first order diffracted beam produced by said first grating region, said first photoelectric transducer being disposed at a position of a least circle of confusion of said positive first order diffracted beam produced by said first grating region, a single, non-partitioned second photoelectric transducer receiving a positive first order diffracted beam produced by said second grating region;

said second photoelectric transducer being disposed at a position of a least circle of confusion of said positive first order diffracted beam produced by said second grating region;

a single, non-partitioned third photoelectric transducer receiving a negative first order diffracted beam produced by said first grating region, said third photoelectric transducer being disposed at a position of a least circle of confusion of said negative first order diffracted beam produced by said first grating region;

a single, non-partitioned fourth photoelectric transducer receiving a negative first order diffracted beam produced by said second grating region, said fourth photoelectric transducer being disposed at a position of a least circle of confusion of said negative first order diffracted beam produced by said second grating region, a first analyzer provided in front of said first photoelectric transducer and said second photoelectric transducer, a transmitting axis of said first analyzer being angled almost 45° with respect to a polarizing direction of a light source;

a second analyzer provided in front of said third photoelectric transducer and said fourth photoelectric transducer, a transmitting axis of said second analyzer being perpendicular to said transmitting axis of said first analyzer;

focusing servo means for effecting focusing in response to a difference signal between a sum of outputs from said first photoelectric transducer and said second photoelectric transducer and a sum of outputs from said third photoelectric transducer and said fourth photoelectric transducer;

tracking servo means for effecting tracking in response to a difference signal between a sum of outputs from said first photoelectric transducer and said third photoelectric transducer and a sum of outputs from said second photoelectric transducer and said fourth photoelectric transducer; and magneto-optical reproducing means for obtaining a magneto-optical reproduced signal from a high frequency component of a difference signal between a sum of outputs from said first photoelectric transducer and said second photoelectric transducer and a sum of outputs from said third photoelectric transducer and said fourth photoelectric transducer.

5. The optical head as claimed in claim 1 or 2, wherein each light receiving region of each of said four photoelectric transducers is covered by a light shielding mask.

6. The optical head as claimed in claims 1 or 2, wherein said four photoelectric transducers are mounted on a base mount in a package such that said transducers are perpendicular to or are inclined with respect to an optical axis of said zero-order diffracted light.

7. The optical head as claimed in claims 1 or 2, wherein said four photoelectric transducers are mounted on a base mount in a package for packaging a light source such that said transducers extend perpendicular to or are inclined with respect to an optical axis of said zero-order diffracted light.

* * * * *

UNITED STATES PATENT AND TRADEMARK OFFICE
CERTIFICATE OF CORRECTION

PATENT NO. : 5,436,876
DATED : July 25, 1995
INVENTOR(S) : Osamu Yokoyama et al.

It is certified that error(s) appears in the above-identified patent and that said Letters Patent is hereby corrected as shown below:

On the title page,

In [73] Assignee: change "Seiki Epson Corporation, Tokyo,", to --Seiko Epson Corporation, Tokyo--.

Signed and Sealed this

Thirtieth Day of April, 1996

Attest:

BRUCE LEHMAN

Attesting Officer    Commissioner of Patents and Trademarks